(12) United States Patent
Funayama

(10) Patent No.: US 7,302,086 B2
(45) Date of Patent: Nov. 27, 2007

(54) CHANGE INFORMATION RECOGNITION APPARATUS AND CHANGE INFORMATION RECOGNITION METHOD

(75) Inventor: Ryuji Funayama, Tokyo (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 11/240,598

(22) Filed: Oct. 3, 2005

(65) Prior Publication Data

US 2006/0029277 A1 Feb. 9, 2006

Related U.S. Application Data

(63) Continuation of application No. PCT/JP2004/005155, filed on Apr. 9, 2004.

(30) Foreign Application Priority Data

Apr. 9, 2003 (JP) .................. P2003-105649

(51) Int. Cl.
*G06K 9/00* (2006.01)
(52) U.S. Cl. .................. 382/115; 382/116; 382/118; 340/5.53; 340/5.83
(58) Field of Classification Search ........ 382/115–116, 382/118; 340/5.53, 5.83
See application file for complete search history.

(56) References Cited

U.S. PATENT DOCUMENTS 6,219,639 B1 * 4/2001 Bakis et al. .................. 704/246

FOREIGN PATENT DOCUMENTS

| EP | 0 863 474 | 9/1998 |
|---|---|---|
| JP | 05 249990 | 9/1993 |
| JP | 7-146938 | 6/1995 |
| JP | 7-261789 | 10/1995 |
| JP | 7-306692 | 11/1995 |
| JP | 8-187368 | 7/1996 |
| JP | 10-274516 | 10/1998 |
| JP | 11-353468 | 12/1999 |
| JP | 2000-099071 | 4/2000 |
| JP | 2001-134767 | 5/2001 |
| JP | 2001-147697 | 5/2001 |
| JP | 2001-209814 | 8/2001 |

OTHER PUBLICATIONS

Turk, M. et al., "Eigenfaces for Recognition," *J. Cognitive Neurosci.*, vol. 3, No. 1, 1991 M.I.T.

(Continued)

*Primary Examiner*—Bhavesh M Mehta
*Assistant Examiner*—John B Strege
(74) *Attorney, Agent, or Firm*—Finnegan, Henderson, Farabow, Garrett & Dunner, LLP

(57) ABSTRACT

A change information recognition apparatus comprises a series information storing device for storing series information about a recognition object (a motion picture taken by an image taking device, or the like), and a basic change information storing device for preliminarily storing basic change information corresponding to changes of the series information. The series information storing device feeds the series information to a change state comparing device, and the basic change information storing device feeds the basic change information to the change state comparing device. The change state comparing device compares the change information with the basic change information thus fed, to recognize a change state of the recognition object.

4 Claims, 47 Drawing Sheets

OTHER PUBLICATIONS

Murase, H., et al., "Visual Learning and Recognition of 3-D Objects from Appearance," *Intl. J. Computer Vision*, 14, 5-24 (1995).

Black, M., et al., "Eigen Tracking: Robust Matching and Tracking of Articulated Objects Using a View-Based Representation," *Intl. J. Computer Vision*, 26(1), 63-84 (1998).

Sagayama S., "Topics 16 DP vs. HMM,", *J. Accoustical Soc. Japan*, vol. 57, No. 1 (2000).

Abe, Y., et al., Article: Method for recognition of phonological boundary information, *The Accoustical Society of Japan*, 1-8-5 (Oct. 1993).

Funayama, R., et al., "Cooperative Active Net Models and Its Application to Facial Component Extraction," *Inst. IEICE*, PRU95-179 (1995).

Tamoto, M., et al., "Face Direction Recognition based on Acoustic Reflection Characteristics," *Inst. IEICE*, SP96-60 (1996).

Sugahara, K., et al., "Real time realization of word recognition system based on voice and lip movement information," *Inst. IEICE*, NLC90-86, PRMU99-269 (2000).

Kadomaru, T. and Abe, Y., et al., Article: analysis method to use lip image formation for the analysis of speech speed, *The Accoustical Soc. of Japan* 1-Q-12 (Oct. 1993).

Japanese Office Action dated Jan. 30, 2007.

Supplementary European Search Report dated Jan. 30, 2007.

Fujimoto, Y., et al., "Retrieval of Image Sequences Based on Similarity of Trajectories in Eigenspaces," *Technical Report of IEICE*, PRMU96-110, vol. 96, No. 435, Dec. 19, 1996, pp. 49-56.

Yokoyama, T., et al., "Hierarchical parametric eigenspace," *Technical Report of IEICE*, PRMU99-173 (1999-12).

Japanese Office Action dated Jul. 17, 2007.

\* cited by examiner

Fig.6A T1
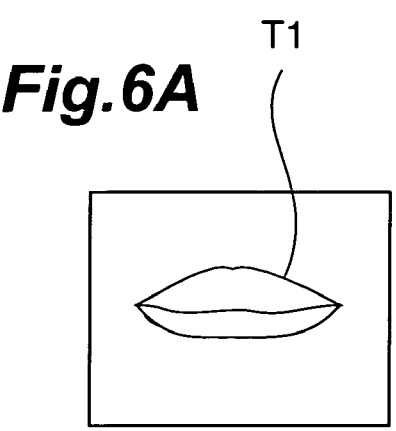
Fig.6B T2
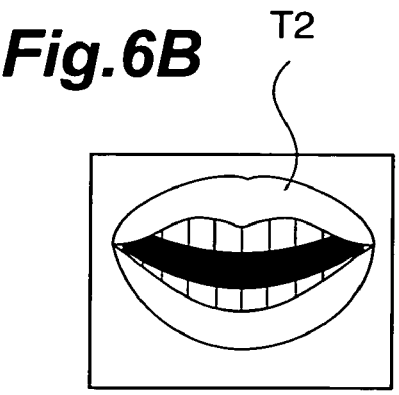
Fig.6C T3
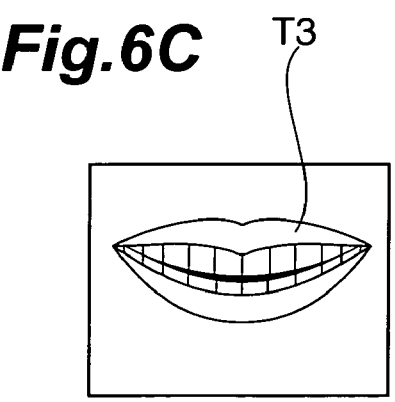
Fig.6D T4
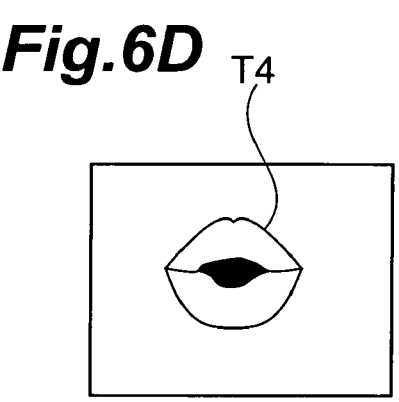
Fig.6E T5
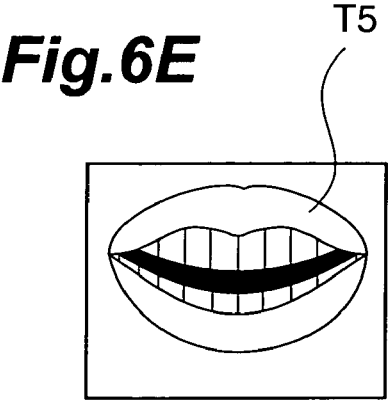
Fig.6F T6
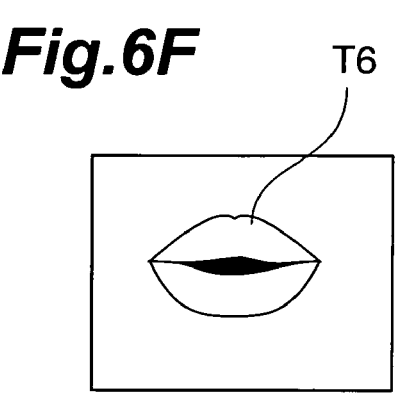

Fig.14

| START \ END | A | I | U | E | O | N |
|---|---|---|---|---|---|---|
| A |  | 12 | 13 | 14 | 15 | 10 |
| I | 21 |  | 23 | 24 | 25 | 20 |
| U | 31 | 32 |  | 34 | 35 | 30 |
| E | 41 | 42 | 43 |  | 45 | 40 |
| O | 51 | 52 | 53 | 54 |  | 50 |
| N | 01 | 02 | 03 | 04 | 05 |  |

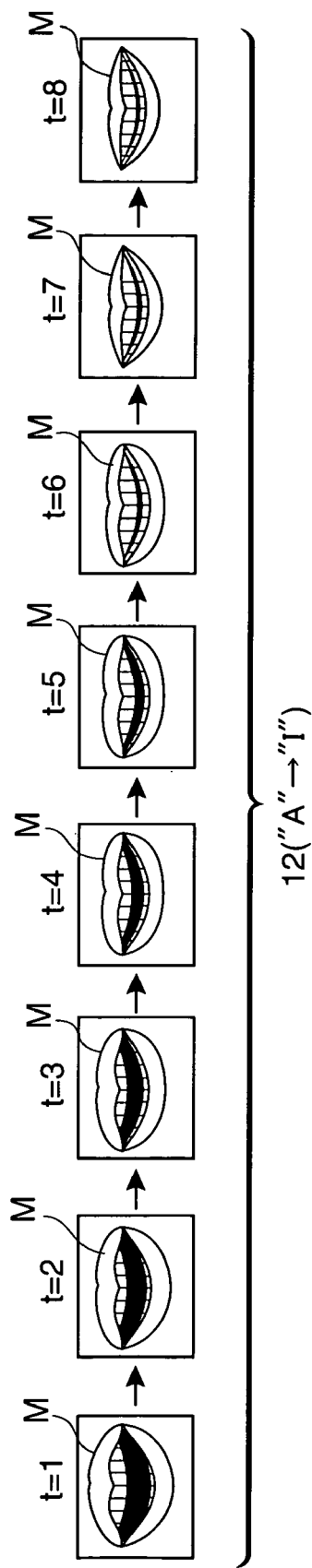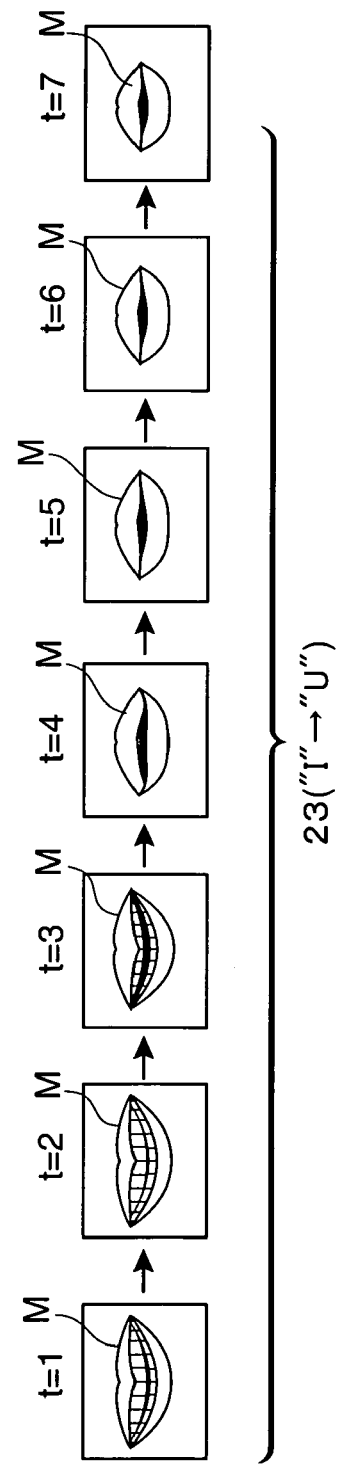

t=1 t=2 t=3 t=4 t=5 t=6 t=7 t=8 t=1 t=2 t=3 t=4 t=5 t=6 t=7 t=8

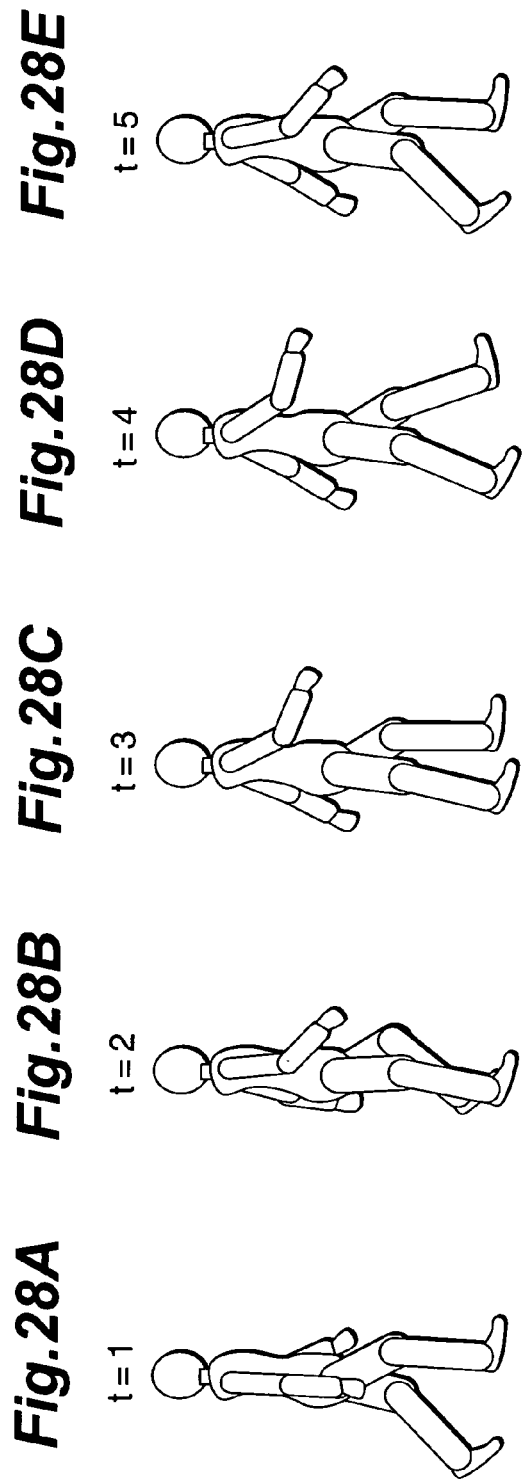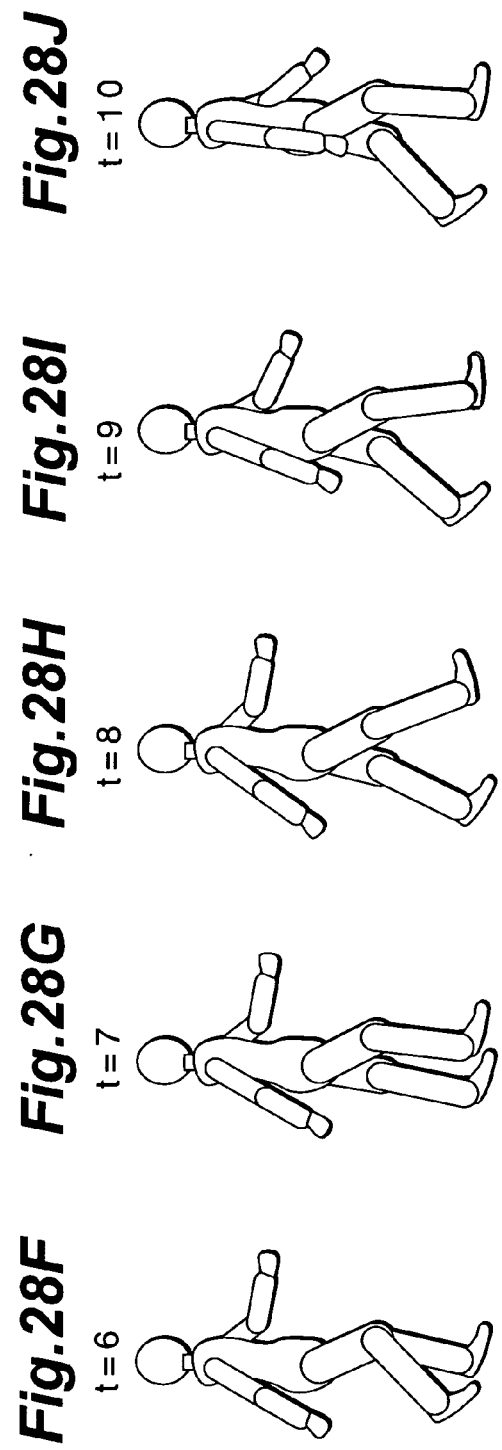

CHANGE INFORMATION RECOGNITION APPARATUS AND CHANGE INFORMATION RECOGNITION METHOD

This application is a continuation of International Application No. PCT/JP2004/005155 filed on Apr. 9. 2004.

BACKGROUND OF THE INVENTION

1. Field of the Invention

The present invention relates to a change information recognition apparatus and change information recognition method for recognizing a change state of a recognition object, such as a motion of a mouth, a voice uttered by a mouth, or a motion of a man.

2. Related Background Art

In the fields of image processing and others, there are techniques of recognizing a change of a state-varying object, such as a voice of a man or a motion of a man, from an image picked up. An apparatus for recognizing such a state change is, for example, a direction detecting device for a face disclosed in Japanese Patent Application Laid-Open No. 10-274516. This direction detecting device for the face is configured to extract a face region and characteristic regions such as the eyes and the mouth from an image taken by a camera and to detect a direction of the face from the center position of the face region and the like.

SUMMARY OF THE INVENTION

The above-described face direction detecting device disclosed in Japanese Patent Application Laid-Open No. 10-274516 is able to detect the direction of the face after the extraction of the position of the mouth and others, but is unable to detect a motion of the mouth or the like. For this reason, the device had a problem that it was unable to recognize a human word or the like.

Therefore, an object of the present invention is to provide a change information recognition apparatus and a change information recognition method capable of accurately recognizing a change state of a recognition object and thereby recognizing, for example, a word uttered by a man or the like.

A change information recognition apparatus according to the present invention is an apparatus comprising: change information acquiring means for acquiring change information of a recognition object; basic change information storing means for preliminarily storing basic change states of the recognition object as basic change information; and change state comparing means for comparing the change information of the recognition object acquired by the change information acquiring means, with the basic change information preliminarily stored and thereby detecting a change state of the recognition object.

In the change information recognition apparatus according to the present invention, the change information acquired by the change information acquiring means is compared with the basic change information preliminarily stored, to recognize the recognition object. For example, where the recognition object is one often demonstrating motions with certain correlations, such as the mouth of a man, it becomes feasible to securely recognize the recognition object, by preliminarily storing the motions as the basic change information and comparing the acquired change information therewith.

In a preferred configuration, the basic change information storing means stores the basic change information in the form of change information units resulting from division of the change state of the recognition object into basic units.

By adopting this configuration wherein the basic change information is stored in the form of the divisional information in the change information units, it is feasible to recognize the recognition object with higher accuracy.

The apparatus can be so configured that the change information acquiring means is image taking means for taking an image of the recognition object and that the change information is information about a change in an image of a region around a mouth in association with an utterance in the image acquired by the image taking means.

By adopting this configuration wherein the change information is the change in the image of the region around the mouth in association with the utterance, it is feasible to accurately recognize the contents of the utterance of a man.

Furthermore, the apparatus can also be so configured that the change information acquiring means is sound collecting means for acquiring a sound produced by the recognition object and that the change information is information about a change in frequency components of the sound produced by the recognition object and acquired by the sound collecting means.

By adopting this configuration wherein the change information is that about frequency components of the sound acquired from the sound collecting means, e.g., a microphone, it is feasible to recognize the sound generated by the recognition object, e.g., the contents of an utterance of a man with high accuracy.

The apparatus can also be so configured that the change information acquiring means is image taking means for taking an image of the recognition object and that the change information is information about a change in an image in association with a motion of the recognition object in the image acquired by the image taking means. Alternatively, the apparatus can also be so configured that the change information acquiring means is image taking means for taking an image of the recognition object and that the change information is information about a change in an image in association with a rotation of the recognition object in the image acquired by the image taking means.

Even in these cases where the change information is the change in the image due to the motion or rotation of the recognition object, it is feasible to recognize such change with high accuracy.

In another preferred configuration, the aforementioned basic change information is basic change series information set as series of information on a feature space; the change information recognition apparatus further comprises a change information projection device for projecting change series information of the recognition object acquired by the change information acquiring means, onto the feature space to create projective change information; instead of comparing the change information of the recognition object with the basic change information, the change state comparing means compares the projective change information with the basic change series information to recognize the change state of the recognition object.

In the present invention, the change information is recognized as a series of information on the feature space. For this reason, the change series information acquired is compared with the basic change series information preliminarily set. For this reason, it is feasible to quantitatively determine the degree of similarity (goodness of fit) between the acquired change series information and the basic change series information.

In another preferred configuration, the change state comparing means compares a continuity property of the basic change series information with a continuity property of the projective change information to recognize the change state of the recognition object. By adopting this configuration wherein the continuity property of the projected change series information as the projective change information is compared with the basic change series information, it is feasible to accurately recognize the recognition object moving with change.

Multidimensionally representable information can be expressed as a point on a multidimensional space. This information can be projected to a point on a lower-dimensional space, and this lower-dimensional space is defined as a feature space.

For example, a still image that can be represented as a point on a multidimensional space can be projected to a point on a three-dimensional space (feature space). In this case, a plurality of consecutive images can be expressed as a line (projective locus) on the three-dimensional space (feature space). The basic series information is set in the form of a tubular region on the feature space, and the projective locus on the feature space obtained from the projective change information is compared with the tubular region (e.g., a comparison is made to determine whether the projective locus is included in the tubular region), whereby it becomes feasible to recognize the change state of the recognition object.

In another preferred configuration, the apparatus further comprises learning means for creating the basic change series information, based on the change information of the recognition object acquired by the change information acquiring means. By adopting this configuration wherein the apparatus comprises the learning means for creating or updating the basic change information, based on the change of the recognition object acquired by the change information acquiring means, it is feasible to accurately create the basic change series information according to the recognition object.

In another aspect, a change information recognition method according to the present invention, which achieved the above object, is a method comprising: a change information acquiring step of acquiring change information of a recognition object; a basic-change-information preliminarily storing step of preliminarily storing basic change states of the recognition object as basic change information; and a change state comparing step of comparing the change information of the recognition object acquired in the change information acquiring step, with the basic change information preliminarily stored, to recognize a change state of the recognition object.

In a preferred configuration, the basic-change preliminarily storing step comprises preliminarily storing change information units resulting from division of the change state of the recognition object into basic units, as the basic change information. By adopting this configuration wherein the basic change information is stored in the form of the divisional information in the change information units, it is feasible to recognize the recognition object with higher accuracy.

In another preferred configuration, the change information acquired in the change information acquiring step is information about an image taken from the recognition object, and the basic change information preliminarily stored in the basic-change-information preliminarily storing step is also information about an image; the change state comparing step comprises comparing the change information with the information about the image of the basic change information to recognize the change state of the recognition object. By adopting this configuration wherein the change information is the information about the image taken from the recognition object, it is feasible to recognize the change of the recognition object with high accuracy.

In a further preferred configuration, the change information acquired in the change information acquiring step is information about a sound produced by the recognition object, and the basic change information preliminarily stored in the basic-change-information preliminarily storing step is also information about a sound; the change state comparing step comprises comparing frequency components of the sound in the change information with those of the sound in the basic change information to recognize the change state of the recognition object. By adopting this configuration wherein the change information is the information about the sound produced by the recognition object, it is feasible to recognize the sound produced by the recognition object, e.g., the contents of an utterance of a man with high accuracy.

BRIEF DESCRIPTION OF THE DRAWINGS

FIGS. 6A to 6F are illustrations schematically showing conventional templates of shapes of a mouth.

FIG. 14 is a table showing a correspondence between pronunciation changes and symbols assigned thereto.

FIG. 16A depicts characters corresponding to sounds of "OHAYOUGOZAIMASU."

FIG. 18A is an illustration schematically showing a change of shapes of a mouth changing from "A" to "I."

FIG. 18B is an illustration schematically showing a change of shapes of a mouth changing from "I" to "U."

FIGS. 28A to 28J are illustrations showing an example of images at respective times of basic body change units in recognition of a walking person.

DESCRIPTION OF THE PREFERED EMBODIMENTS

The preferred embodiments of the present invention will be described below in detail with reference to the drawings. Redundant description will be avoided on occasions in each of the embodiments.

Figure 1:
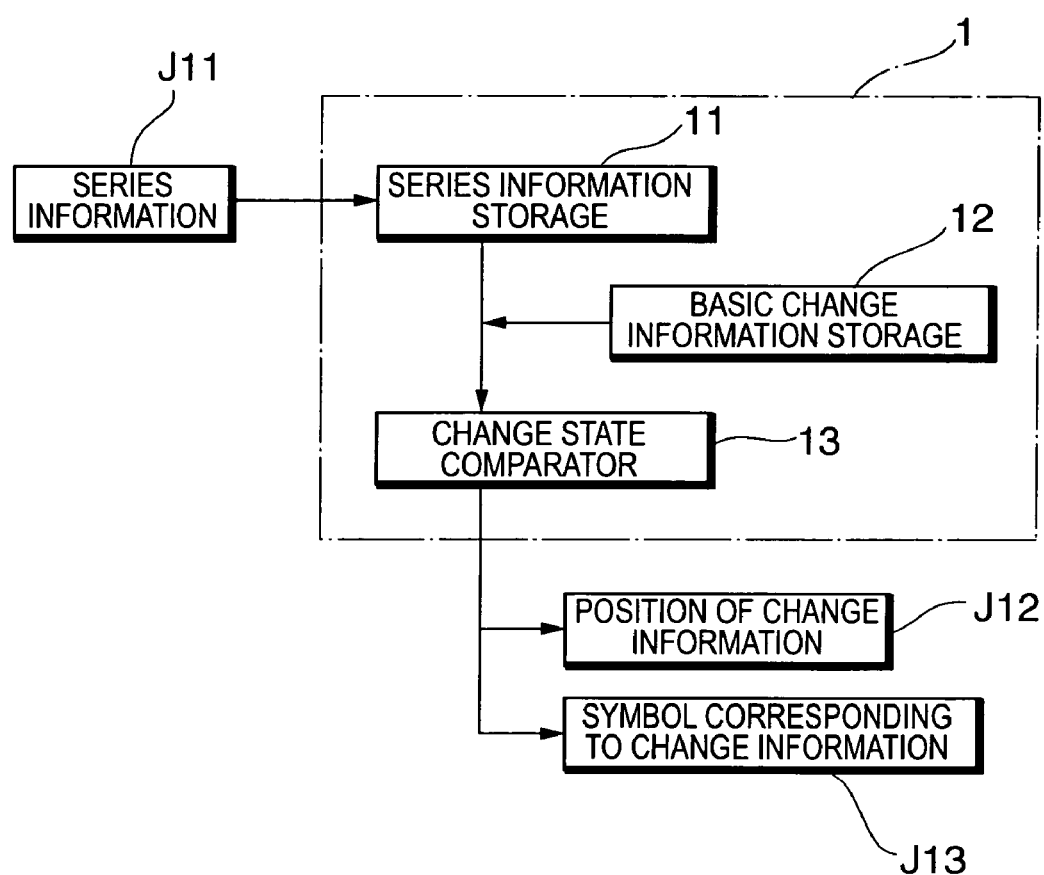
FIG. 1 is a block configuration diagram of a change information recognition apparatus according to the first embodiment of the present invention.

First, the first embodiment of the present invention will be described. FIG. 1 is a block configuration diagram of a change information recognition apparatus according to the present embodiment. As shown in FIG. 1, the change information recognition apparatus 1 of the present embodiment is comprised of a series information storing device 11, a basic change information storing device 12, and a change state comparing device 13.

The series information storing device 11 is connected to an unrepresented camera serving as an image taking device which is the change information acquiring means of the present invention. The camera takes an image of a face including a mouth as a recognition object. The image of the mouth of a man taken is fed at intervals of a fixed period of time to the series information storing device 11. The series information storing device 11 stores these images fed at intervals of the fixed time, as series information J11.

The basic change information storing device 12 preliminarily stores a plurality of patterns that can be made by shapes of human mouths. The patterns that can be made by shapes of mouths will be described later in detail.

The series information storing device 11 feeds the series information to the change state comparing device 13 and the basic change information storing device 12 feeds basic change information to the change state comparing device 13. The change state comparing device 13 compares the series information with the basic change information to detect a change in the shape of the mouth and to detect a portion corresponding to the mouth. Furthermore, the change state comparing device 13 is connected to an unrepresented output device and feeds the position of the portion corresponding to the detected mouth, as position information J12 of the change information to the output device. The change state comparing device 13 detects the portion corresponding to the mouth and also detects a motion of the mouth. This detected mouth motion is also fed as symbol information J13 corresponding to the change information, to the unrepresented output device.

Figure 2:
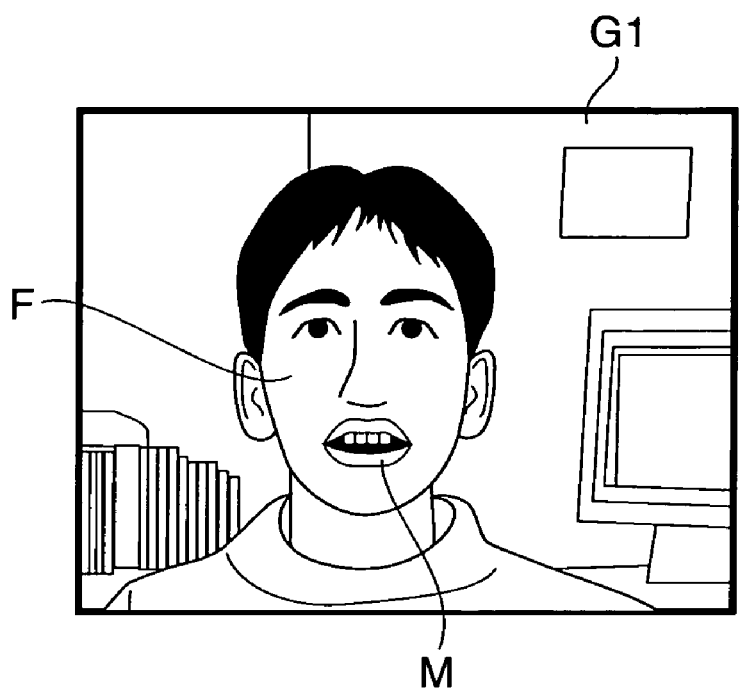
FIG. 2 is an illustration schematically showing an image of a face including a mouth.

Now, let us explain a change information recognition method by the change information recognition apparatus 1 according to the present embodiment. Images taken by the unrepresented camera, e.g., images G1 of a face F including a mouth M as shown in FIG. 2, are sequentially fed to the series information storing device 11 of the change information recognition apparatus 1 according to the present embodiment. The series information storing device 11 stores these images. When a plurality of such images, e.g., eight images are stored, these images are fed together as series information to the change state comparing device 13.

Figure 3A:
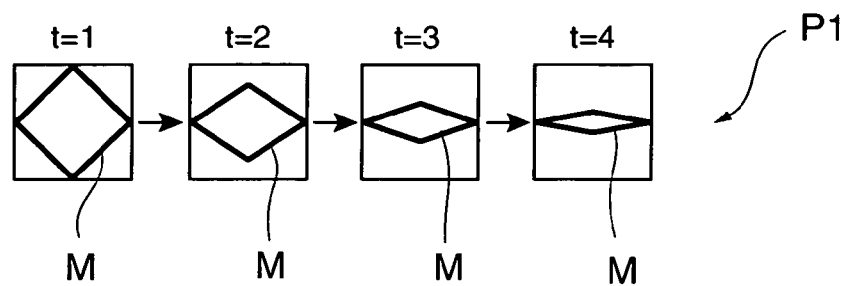
FIG. 3A is an illustration schematically showing a template representing a continuously changing state of shapes of a mouth (first example).
Figure 3B:
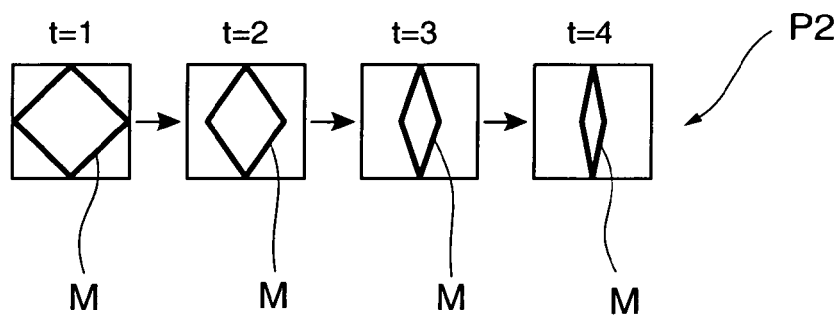
FIG. 3B is an illustration schematically showing a template representing a continuously changing state of shapes of a mouth (second example).
Figure 4A:
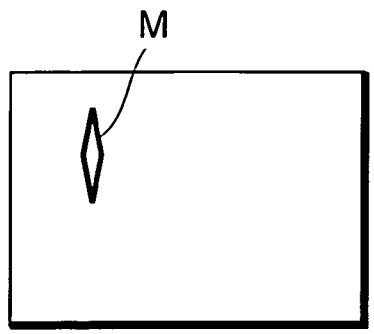
FIGS. 4A to 4H are illustrations schematically showing a continuously changing state of shapes of a mouth in images.
Figure 4B:
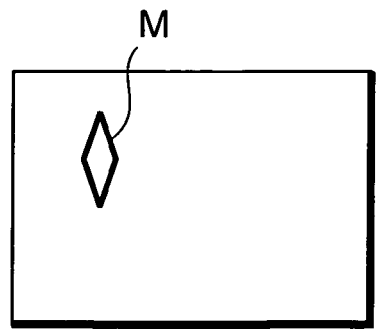
Figure 4C:
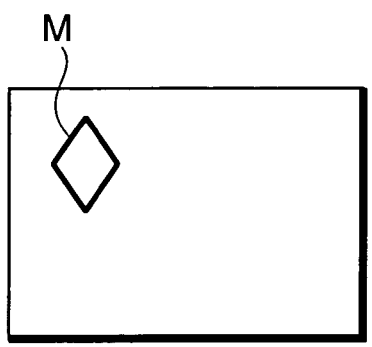
Figure 4D:
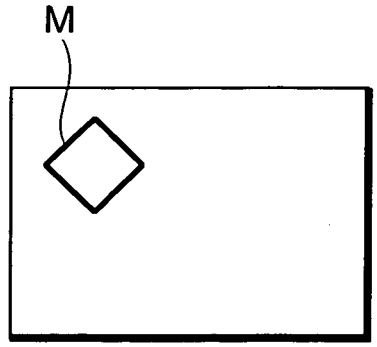
Figure 4E:
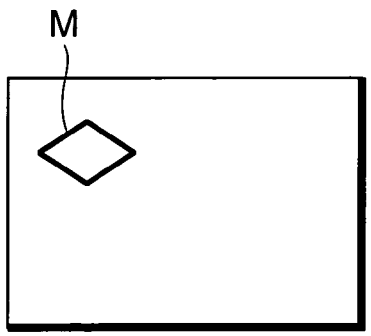
Figure 4F:
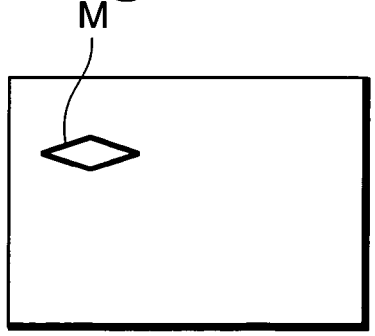
Figure 4G:
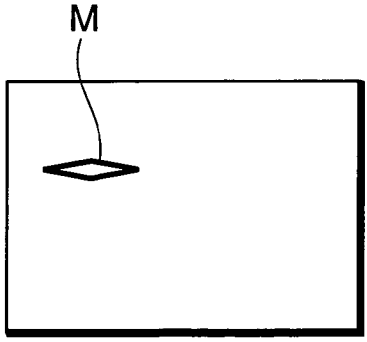
Figure 4H:
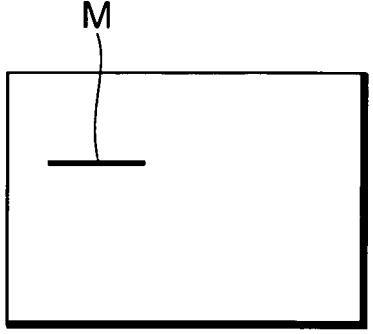
Figure 5A:
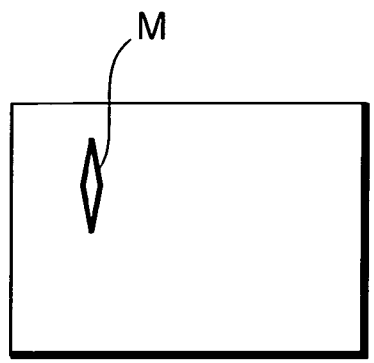
FIGS. 5A to 5H are illustrations schematically showing shapes of a mouth in images, and positions of coincidence with the shapes of the mouth in the templates.
Figure 5B:
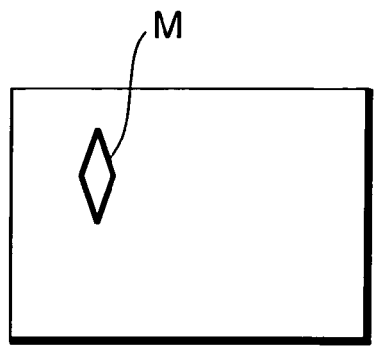
Figure 5C:
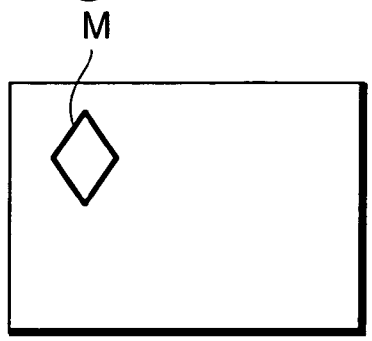
Figure 5D:
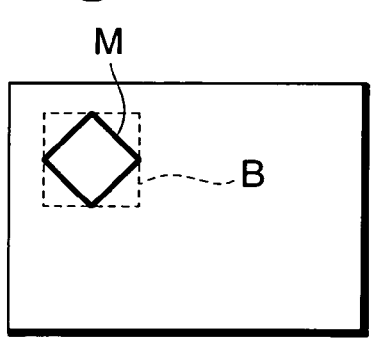
Figure 5E:
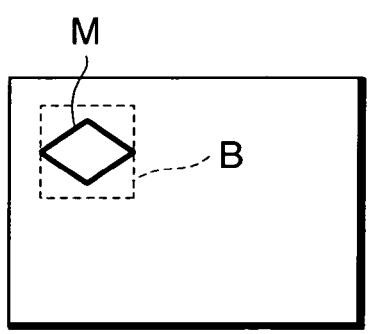
Figure 5F:
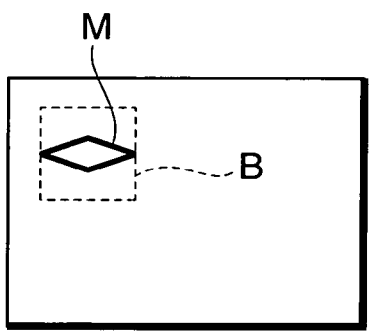
Figure 5G:
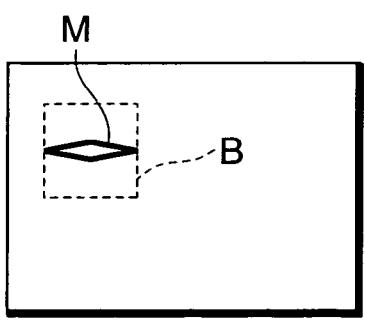
Figure 5H:
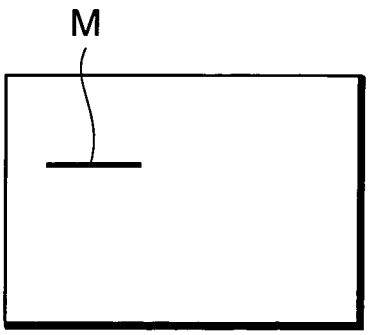

The basic change information storing device 12 stores a plurality of image information representing patterns of changes of mouth. For example, the basic change information storing device 12 stores a first change pattern of t=1-4 shown in FIG. 3A, as a first template P1 and a second change pattern of t=1-4 shown in FIG. 3B, as a second template P2. In the two change patterns, an image at a certain time is the image at t=1, a next image after passage of a fixed time is the image at t=2, an image after passage of another fixed time is the image at t=3, and an image after passage of still another fixed time is the image at t=4. The first change pattern represented by the first template P1 indicates a state of a change from a shape of largely opening mouth M (the shape of the mouth uttering the vowel of "A") to a shape of horizontally wide opening mouth M (the shape of the mouth uttering the vowel of "I"). The second change pattern represented by the second template P2 indicates a state of a change from a shape of largely opening mouth M (the shape of the mouth uttering the vowel of "A") to a shape of vertically long opening mouth M (the shape of the mouth uttering the vowel of "O").

The series information storing device 11 feeds a motion picture of series information consisting of eight images, to the change state comparing device 13, and the basic change information storing device 12 feeds the templates P1, P2 representing the first and second change patterns, to the change state comparing device 13. Let us suppose herein that the series information fed from the series information storing device 11 included a region indicating the change shown in FIG. 4. FIGS. 4A to 4H depict images corresponding to respective times t=1-8. When the motion of the shapes in the images shown in FIG. 4 is compared with the motions of the shapes in the templates P1, P2 shown in FIG. 3, it is found that the motion of the template P1 coincides with the motion represented by FIGS. 4D-4G, as shown in FIG. 5. It can be recognized from this fact that the part indicated by dashed line B in FIGS. 5D-5G is a portion corresponding to the mouth. It can also be recognized at the same time that the mouth was in the motion corresponding to the first template P1 during this period.

The conventional method was configured to prepare a plurality of mouth templates T1-T6, for example as shown in FIGS. 6A to 6F, to raster-scan an image taken by an image taking device, and to detect every portion corresponding to the templates T1-T6, as a mouth. However, this method possibly causes such inconveniences as erroneous detection to detect a shape similar to a mouth, as a mouth, even if it is a stain on a wall or a part of the background in an image, or detection failure.

In contrast to it, the change information recognition apparatus of the present embodiment is configured to find a transformation pattern of changing shapes, instead of using only instantaneously clipped images like still images as objects, and is thus able to reduce the erroneous detection, the detection failure, and so on. In addition, it is able to simultaneously identify a position of a mouth and a state of transformation thereof. FIG. 3 to FIG. 5 were described in the form of application to the motion of the mouth, for simplicity of description. However, the present invention is by no means intended to be limited particularly to the motion of the mouth, but the present invention can also be applied to every technology associated with general transformation of graphics.

Figure 7:
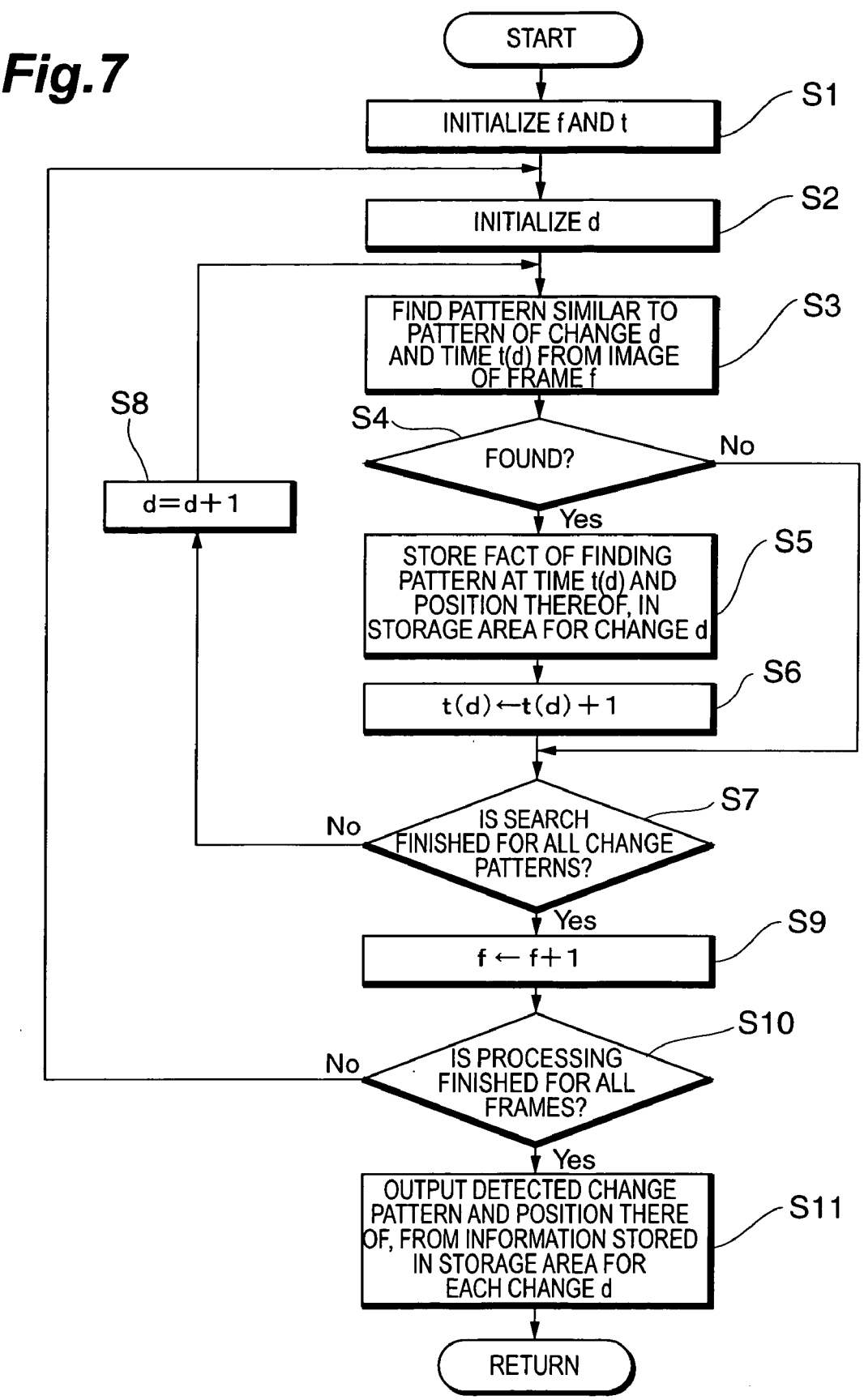
FIG. 7 is a flowchart showing a procedure of a change information recognition method according to the first embodiment.

Subsequently, a specific change information recognition method of the present embodiment will be described. FIG. 7 is a flowchart showing a procedure of a change information recognition method according to the present embodiment. In the change information recognition method of the present embodiment, as shown in FIG. 7, the first step is to initialize variable f (domain of f=1-8) representing a frame number of one of eight images and variable t (domain of t=1-8) representing one of taking times of those images (S1), and the next step is to initialize variable d (d=1, 2) representing one of the change patterns represented by two templates P1, P2 (S2). Subsequently, the image of the first frame f=1 is searched for a pattern similar to the pattern at the time t=1 in the first change pattern d=1 (the time will be referred to hereinafter as "t(d)") (S3), and it is determined whether a pattern similar to the pattern at the time t(d) was found (S4).

When a similar pattern is found as a result, the fact that the pattern at the time t(d) was found and the position where the similar pattern was found in the frame f=1, were stored in a storage area for the change pattern d=1 (S5). Then 1 is added to the time t(d)=1 to obtain t(d)=2 (S6). It is then determined whether the process of finding a similar pattern is finished for all the change patterns d(=1, 2) (S7).

When no similar pattern was found at step S4 on the other hand, the flow moves to step S7 to determine whether the search process is finished for all the change patterns d(=1, 2). When it is then determined at step S7 that the search process is not finished yet for all the change patterns d(=1, 2), the change pattern is incremented to the next change pattern (d+1) (S8) and then the flow returns to step S3 to search the image of the frame f for a similar pattern. When it is determined that the search process is finished for all the change patterns, the flow shifts to the next frame f+1 (S9).

After proceeding to the next frame in this manner, it is determined whether the processing is finished for all the frames f(=1-8) (S10). When the result of the determination is that the processing is not finished yet for all the frames and there remains a frame not subjected to the processing, the flow returns to step S2 to continue the processing. When it is determined on the other hand that the processing is finished for all the frames, a detected change pattern (a symbol corresponding to the change information) and a position thereof are outputted from the information stored in a storage area for each change, through an unrepresented output device (S11). The position of the mouth and the motion of the mouth can be detected in this manner.

Figure 8A:
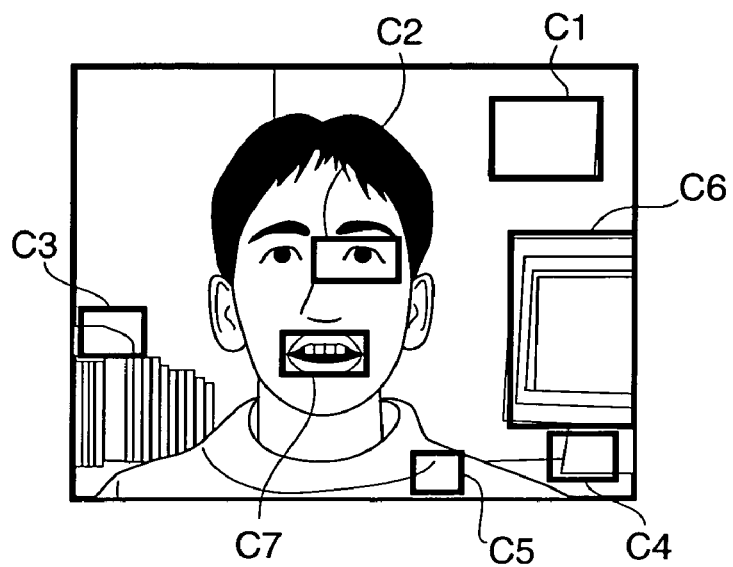
FIG. 8A is an illustration schematically showing positions that can be recognized as a mouth, in a still image.
Figure 8B:
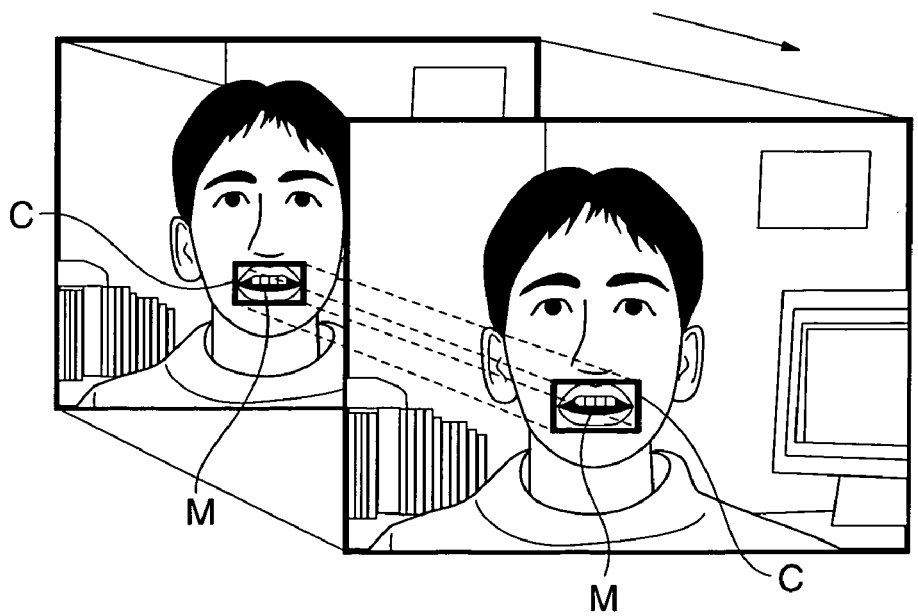
FIG. 8B is an illustration schematically showing positions that can be recognized as a mouth, in a motion picture.

As described above, the change information recognition apparatus 1 of the present embodiment is configured to detect the position of the mouth as the recognition object from the motion of the images in the motion picture, instead of still images. For this reason, the conventional recognition method using the templates for still images comes to recognize a number of candidates C1, C2, . . . for the mouth, as shown in FIG. 8A, whereas the recognition method of the present embodiment is able to securely recognize the mouth M in the candidate C, as shown in FIG. 8B, because it detects a change of the mouth M from a plurality of images taken at intervals of the fixed time. In addition, it is able to detect the motion of the mouth M as well, because the motion of the mouth M is trailed based on a change in the plurality of images.

The present embodiment is arranged to set images at four points of time, the times t=1-4, in each of the templates P1, P2, but the number of images in each template can be 2 or more. For example, it is also possible to set times t=1, 2 and set a template from images at the two times.

Figure 9:
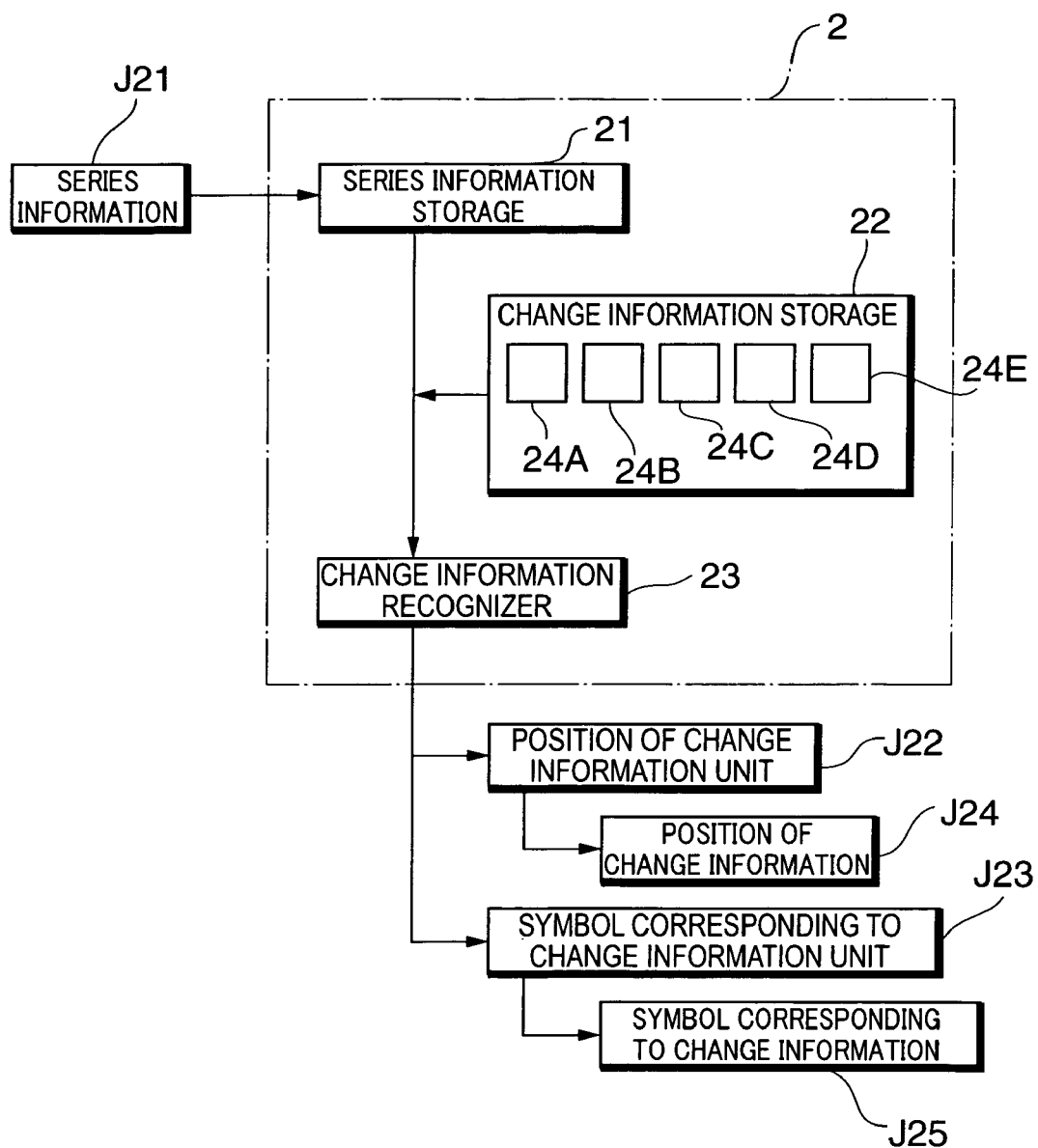
FIG. 9 is a block configuration diagram of a change information recognition apparatus according to the second embodiment.

Next, the second embodiment of the present invention will be described. FIG. 9 is a block configuration diagram of a change information recognition apparatus according to the present embodiment. As shown in FIG. 9, the change information recognition apparatus 2 of the present embodiment is comprised of a series information storing device 21, a basic change information storing device 22, and a change state comparing device 23 similar to those in the first embodiment. Among these, the series information storing device 21 and the change state comparing device 23 have the same configuration as the series information storing device 11 and as the change state comparing device 13, respectively, in the above embodiment, and the basic change information storing device 22 has a configuration different from that of the basic change information storing device 12 in the first embodiment.

Figure 10A:
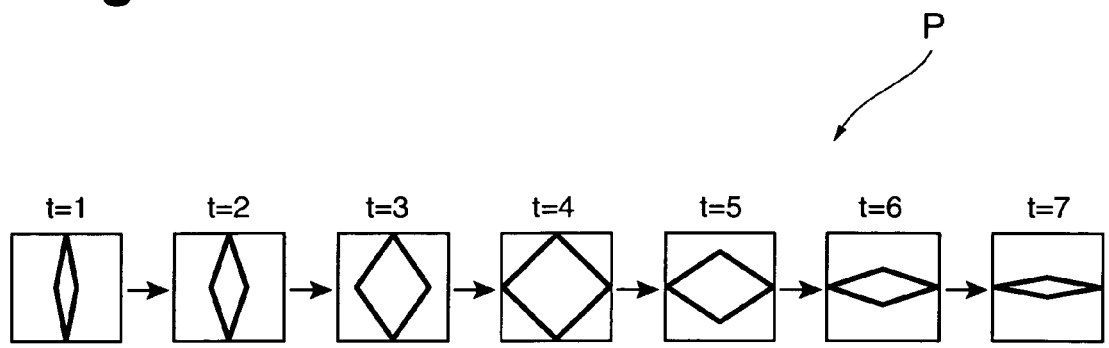
FIG. 10A is an illustration schematically showing a continuous mouth change pattern at each point of time.

The basic change information storing device 22 of the present embodiment has a plurality of basic change information unit storages 24A, 24B . . . Each basic change information unit storage 24A, 24B, . . . stores a change state of a recognition object in the form of a change information unit (change pattern) resulting from division into basic units. This change pattern is a pattern as a minimum unit in a sequential change pattern of the recognition object. For example, suppose there is a change pattern P between times t=1-7 as shown in FIG. 10A. In this sequential change pattern corresponding to the times t=1-7, a change of t=1-4 shown in FIG. 10B can be a minimum unit having a meaning different from that of t=1-4 shown in FIG. 10C (corresponding to the change of t=4-7 in FIG. 10A). For example, it is a case where the change of t=1-4 in FIG. 10A represents the shapes of the mouth changing from "O" to "A" and where the change of t=4-7 represents the shapes of the mouth changing from "A" to "I." The changes like those of t=1-4 shown in FIGS. 10B, 10C are stored as respective templates P3, P4 of minimum units in the respective basic change information unit storages 24A, 24B. . .

Figure 11:
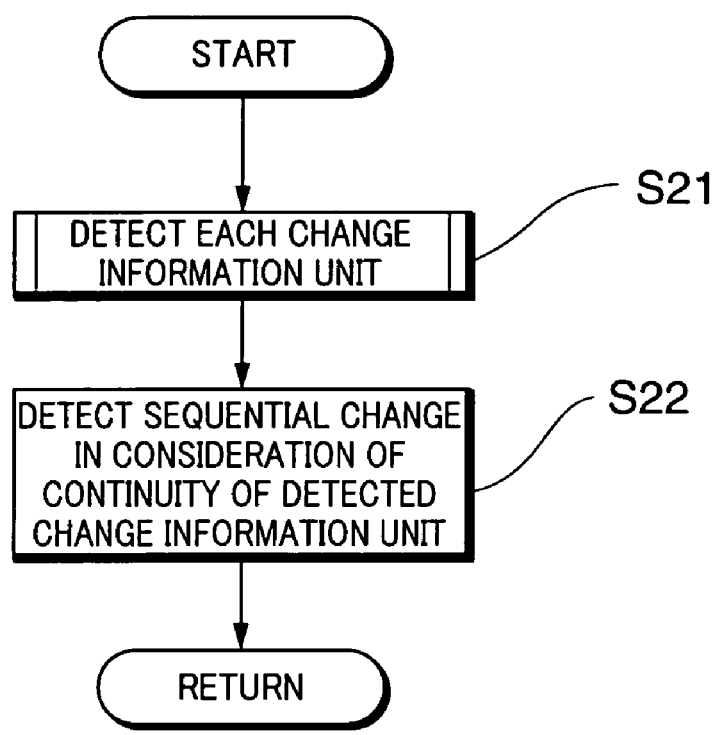
FIG. 11 is a flowchart showing a major part of a procedure of a change information recognition method according to the second embodiment.
Figure 12A:
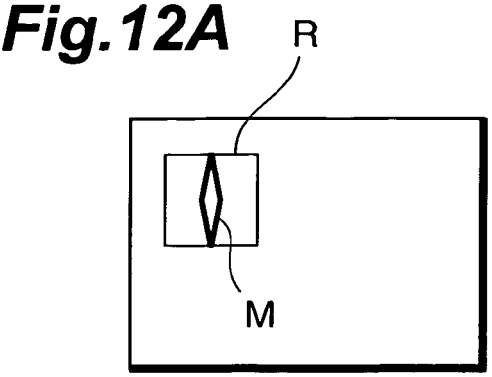
FIGS. 12A to 12H are illustrations schematically showing continuously changing states in images including a mouth.
Figure 12B:
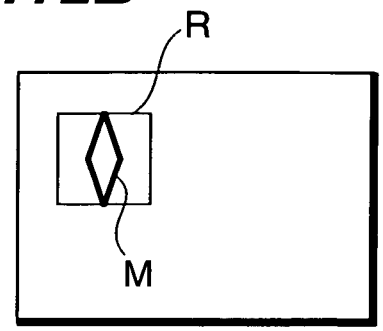
Figure 12C:
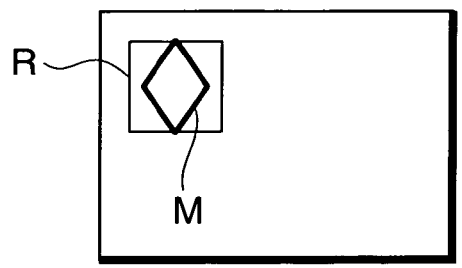
Figure 12D:
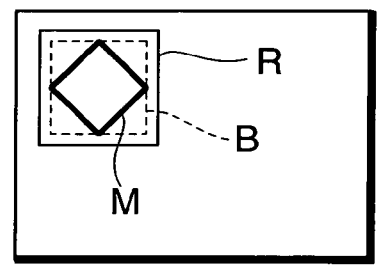
Figure 12E:
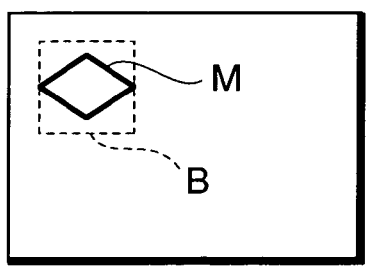
Figure 12F:
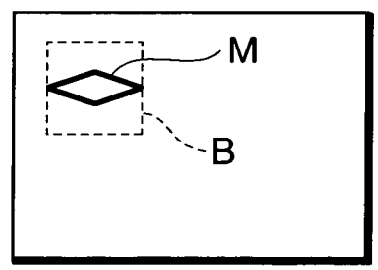
Figure 12G:
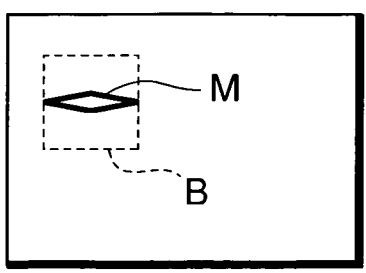
Figure 12H:
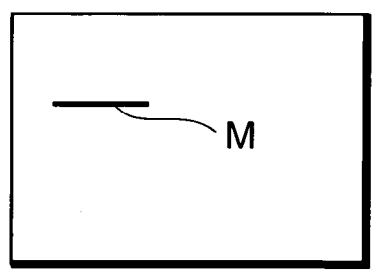

Next, a change information recognition method according to the present embodiment will be described. FIG. 11 is a flowchart showing a major part of a procedure of the change information recognition method according to the present embodiment. As shown in FIG. 11, the change information recognition method of the present embodiment, similar to the recognition method of the first embodiment as described above, is arranged to acquire series information J21 (e.g., information consisting of eight images) in the series information storing device 21 and to feed the series information to the change state comparing device 23. The change state comparing device 23 detects each change information unit from the series information thus fed (S21). The basic change information storing device 22 feeds the templates P3, P4 indicating the basic change information units stored in the basic change information unit storages 24, to the change state comparing device 23.

The change state comparing device 23 compares the detected change information units with the templates P3, P4 of the basic change information units fed from the basic change information storing device 22, to detect a series of changes in consideration of continuity of the change information units (S22). For example, suppose the series information J21 fed from the series information storing device 21 was eight images shown in respective FIGS. 12A-12H. The change state comparing device 23 compares the images of the series information J21 with the templates P3, P4 fed from the basic change information storing device 22, to detect a series of changes in the series information.

Figure 10B:
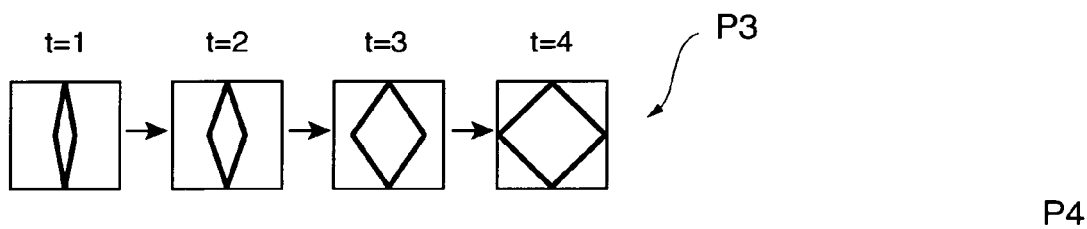
FIG. 10B is an illustration schematically showing a change of the first half in the change pattern shown in FIG. 10A.
Figure 10C:
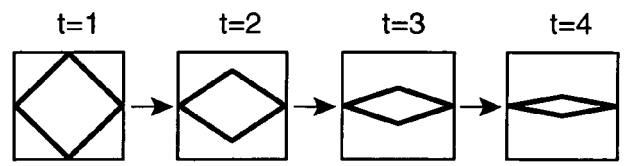
FIG. 10C is an illustration schematically showing a change of the second half in the change pattern shown in FIG. 10A.

In the eight images of the series information shown in FIGS. 12A-12H, the shapes of the mouth M in a solid line R in the images shown in FIGS. 12A-12D indicate the same change as the change of the template P3 shown in FIG. 10B. In addition, the shapes of the mouth M in a dashed line B in the images shown in FIGS. 12D-12G indicate the same change as the change of the template P4 shown in FIG. 10C. It is recognized from this fact that the series information J21 includes the mouth as a recognition object with the shape change shown in FIG. 10A.

The mouth as the change information of the recognition object thus recognized is fed as position information J22 of the change information units from the change state comparing device 23 to an unrepresented output device. At the same time as it, symbol information J23 corresponding to the change information units is fed from the change state comparing device 23 to the unrepresented output device. The output device acquires change information J24 from the position information of the change information units and acquires symbol information J25 corresponding to the change information, from the symbol information J23 corresponding to the change information units.

There is a case wherein, for example, the images representing the series information include the same shape change as the shape change of the template P3 shown in FIG. 10B, but do not include the same shape change as the shape change represented by the template P4 shown in FIG. 10C, subsequent thereto. In this case, it can be determined that the sequential change shown in FIG. 10A does not occur, whereby it is feasible to prevent erroneous detection as a result. Since the storing device preliminarily stores specific combinations of continuous change information units, an arbitrary change can be expressed by a smaller storage capacity. Furthermore, the division of the sequential change into change units smaller than the change enables a state of change to be robustly detected, and further permits a complex change to be expressed by a combination of simpler changes, which facilitates implementation and which permits a complex change to be handled by a smaller storage capacity.

Figure 13:
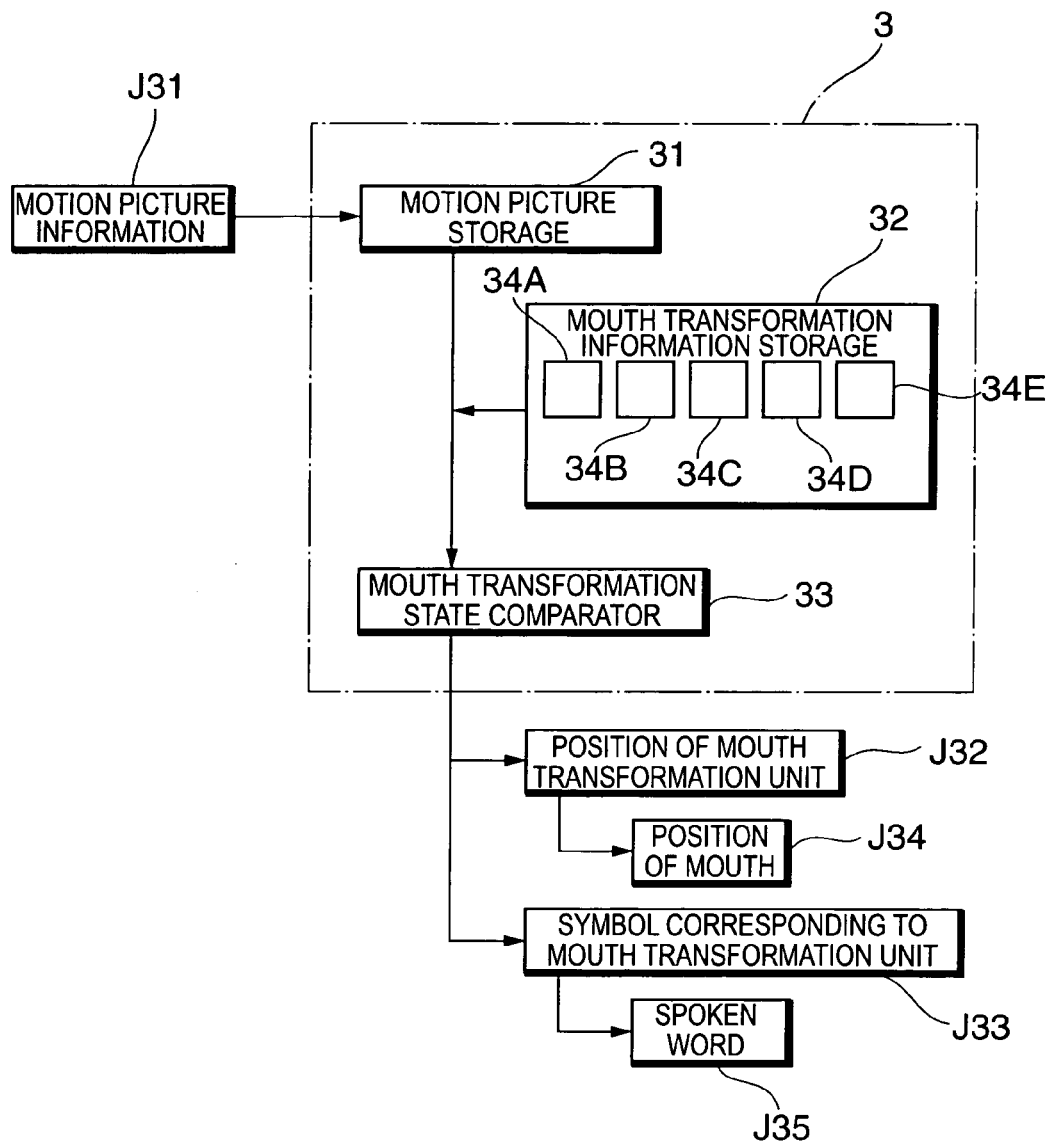
FIG. 13 is a block configuration diagram of a change information recognition apparatus according to the third embodiment.

Next, the third embodiment of the present invention will be described. FIG. 13 is a block configuration diagram of a change information recognition apparatus according to the present embodiment. The change information recognition apparatus of the present embodiment can be used as a mouth transformation recognition apparatus. As shown in FIG. 13, the change information recognition apparatus 3 of the present embodiment is comprised of a motion picture storing device 31, a mouth basic transformation information storing device 32, and a mouth transformation state comparing device 33.

The motion picture storing device 31 is connected to an unrepresented motion picture taking device. This motion picture taking device takes a motion picture of a face including a mouth as a recognition object, and the motion picture taking device feeds motion picture information J31 of the motion picture thus taken, to the motion picture storing device 31.

The mouth basic transformation information storing device 32 has a plurality of mouth basic transformation unit storages 34A, 34B, . . . preliminarily storing respective patterns that can be made by motions of human mouths. Each mouth basic transformation unit storage 34A, 34B, . . . preliminarily stores a mouth basic transformation unit. This mouth basic transformation unit will be described later.

The motion picture storing device 31 feeds the mouth transformation unit information to the mouth transformation state comparing device 33 and the mouth basic transformation information storing device 32 feeds the mouth basic transformation unit information to the mouth transformation state comparing device 33. The mouth transformation state comparing device 33 compares the mouth transformation unit information with the mouth basic transformation unit information to recognize a motion of the mouth. Furthermore, the mouth transformation state comparing device 33 is connected to an unrepresented output device, and feeds a position of each mouth transformation unit fed from the motion picture storing device 31, as mouth transformation unit position information J32 to the output device. At the same time as it, the comparing device 33 feeds symbol information J33 corresponding to the mouth transformation unit, to the output device.

Each of the mouth basic transformation unit storages 34A, 34B, . . . in the mouth basic transformation information storing device 32 stores a shape of a mouth transformation unit corresponding to a motion picture showing a mouth transformation pattern, and symbol information corresponding to the shape. The shapes of the mouth in an utterance of a man are determined mainly by vowels and nasal sound (in Japanese). The vowels are the five sounds of "A," "I," "U," "E," and "O," and, including "N" being a nasal sound in addition to these vowels, every utterance can be expressed as a combination of these six sounds with five sounds except for it. FIG. 14 is a table showing assignment of symbols to all the combinations from the aforementioned six sounds to the other five sounds.

Figure 15:
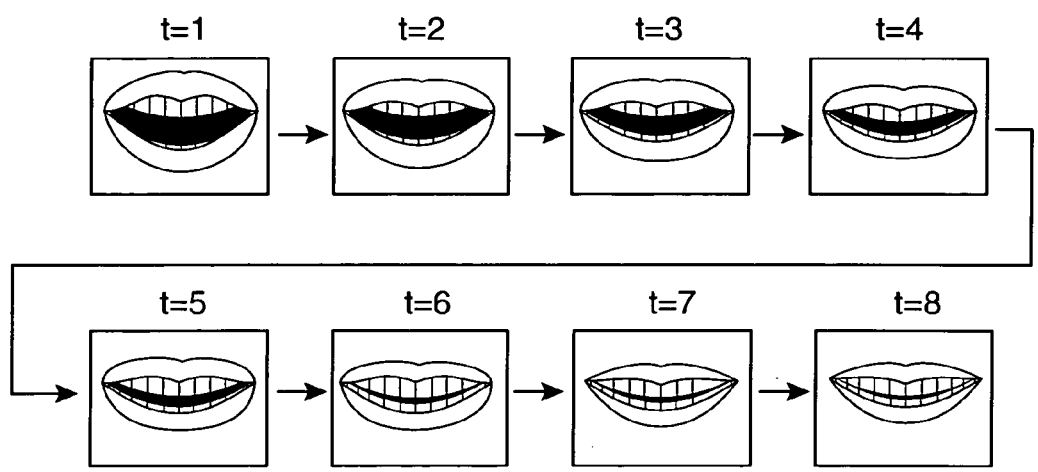
FIG. 15 is an illustration schematically showing a transformation process of a mouth from a shape of the mouth uttering a vowel of "A," to a shape of the mouth uttering a vowel of "I."

As shown in FIG. 14, let "A" be 1, "I" be 2, "U" be 3, "E" be 4, "O" be 5, and "N" be 0; then, for example, a transformation from "A" to "I" is expressed by a symbol of "12." FIG. 15 schematically depicts a transformation process of the mouth from the shape of the mouth uttering the vowel of "A" to the shape of the mouth uttering the vowel of "I." At the time t=1, the sound of "A" is uttered, and the mouth M is in a wide open state. As time passes from this state, the mouth transforms so as to gradually narrow, and at the time t=8, the mouth M is of the shape uttering the sound of "I." In this manner, the transformation of the mouth from "A" to "I" is represented by consecutive images in the period from t=1 to t=8. A motion picture showing this transformation of the mouth from "A" to "I" is represented by symbol "12," using symbol "1" indicating "A" and symbol "2" indicating "I."

Figure 16B:
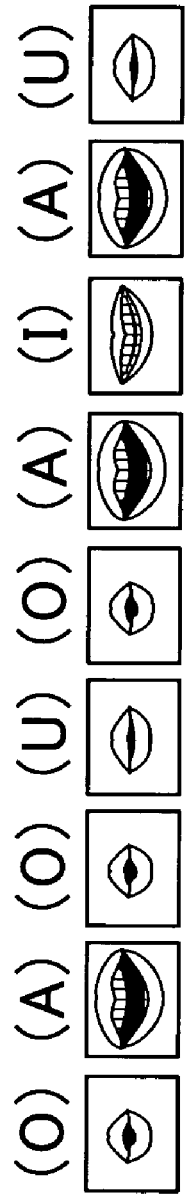
FIG. 16B is an illustration schematically showing shapes of the mouth corresponding to the respective sounds in FIG. 16A.
Figure 16C:
FIG. 16C is an illustration showing symbols corresponding to respective changes of the sounds in FIG. 16B.

Applying this idea, for example, the utterance of "O-HA-YO-U-GO-ZA-I-MA-SU (which is a Japanese word and which means "Good morning" in English)," as shown in FIG. 16A, is represented by "O-A-O-U-O-A-I-A-U", as shown in FIG. 16B, in view of only the vowels except for consonants. The transformation of the mouth in association with this utterance can be expressed as 51→15→53→35→51→12→21→13, as shown in FIG. 16C, using the above symbols. The mouth basic transformation information storing device 32 stores the mouth basic transformation units corresponding to these symbols in the respective mouth basic transformation unit storages 34A, 34B, . . .

The conventional means for recognizing an utterance was the approach of finding the shapes of the mouth representing "A" and "I." In contrast to it, the present embodiment is arranged to capture the transformation process of shapes of the mouth from "A" to "I" in correspondence to the mouth basic transformation storage units preliminarily stored.

Figure 17:
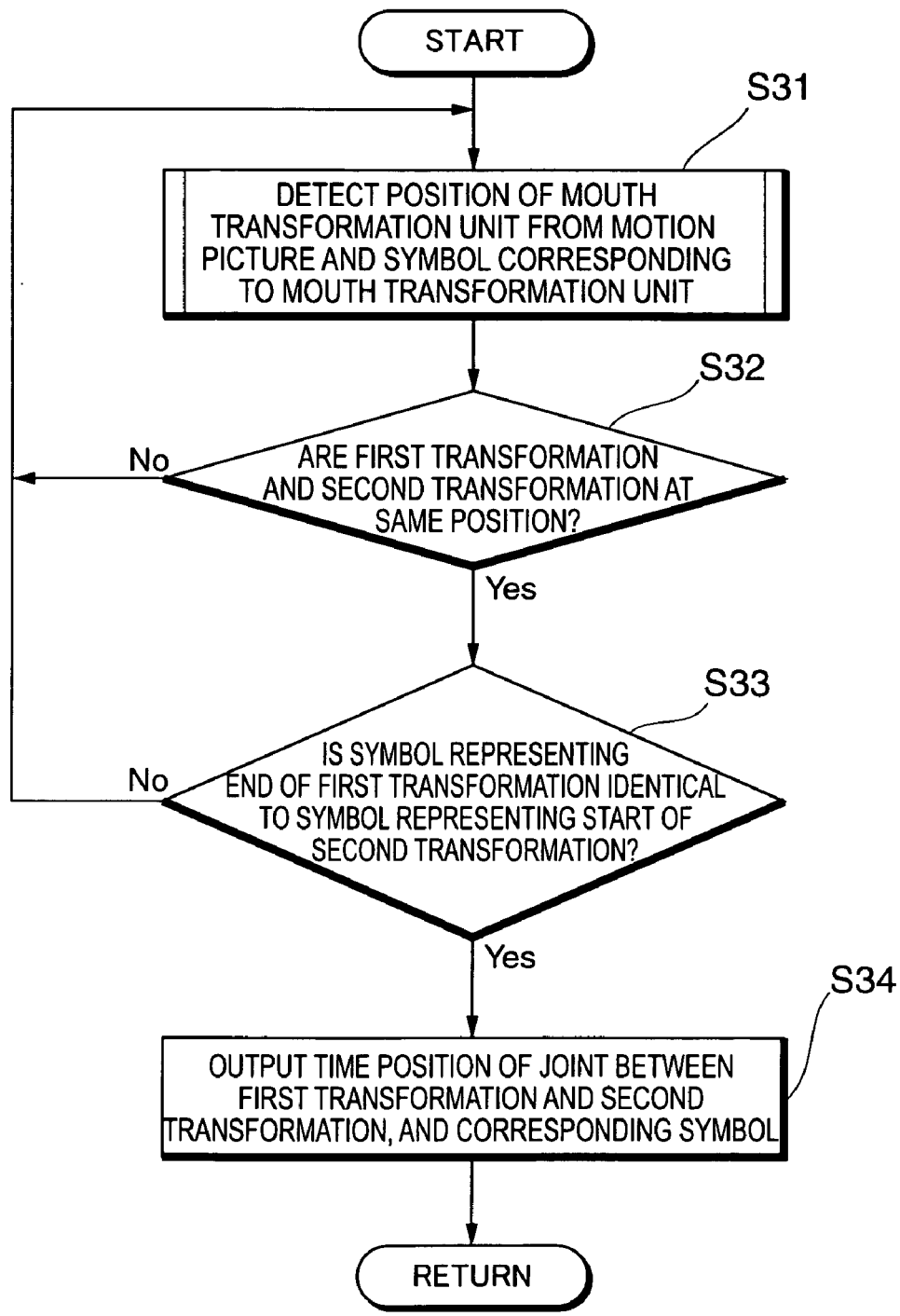
FIG. 17 is a flowchart showing a major part of a procedure of a transformation information recognition method according to the third embodiment.

Now, let us explain a transformation information recognition method by the change information recognition apparatus 3 according to the present embodiment. FIG. 17 is a flowchart showing a major part of a procedure of the transformation information recognition method according to the present embodiment. In the transformation information recognition method of the present embodiment, a motion picture of a face including a mouth, taken by the motion picture taking device, is first fed from the motion picture taking device to the motion picture storing device 31 to be stored therein. On the other hand, the mouth basic transformation information storing device 32 preliminarily stores the change information corresponding to the mouth basic transformation units and the symbols corresponding to the mouth basic transformation units in the respective mouth basic transformation unit storages 34A, 34B . . . The motion picture storing device 31 feeds the motion picture to the mouth transformation state comparing device 33 and the mouth basic transformation information storing device 32 feeds the transformation information of mouth basic transformation units and the symbols corresponding to the mouth basic units to the mouth transformation state comparing device 33.

The mouth transformation state comparing device 33 compares the motion picture fed from the motion picture storing device 31, with the mouth basic transformation units fed from the mouth basic transformation information storing device 32, to detect a position where a mouth transformation unit exists on the motion picture, and a symbol corresponding to the mouth transformation (S31). Next, the comparing device detects a position where a mouth transformation unit exists and a symbol corresponding to the mouth transformation, on a motion picture after passage of a predetermined time. Subsequently, it is determined for each mouth transformation unit detected, whether a first transformation being the first detected mouth transformation unit was made at the same position as a second transformation being the next detected mouth transformation unit was made (S32).

When it is determined that the transformations were not detected at the same position, the flow returns to step S31 to repeat the same processing. When it is determined on the other hand that the transformations were detected at the same position, a symbol indicating an end of the symbol corresponding to the first transformation is compared with a symbol indicating a start of the symbol corresponding to the second transformation, to determine whether they are the same (S33). When it is determined as a result that they are not the same, the flow returns to step S31 to repeat the same processing.

In contrast to it, let us suppose, for example, as shown in FIG. 18A,B, a case wherein the first transformation is the motion of the mouth M as indicated at t=1-8 and represented by the corresponding symbol of 12, and wherein the second transformation is the motion of the mouth M as indicated at t=1 to t=7 and represented by the corresponding symbol of 23. Through comprehension of the utterance at the vowel level, it means that the first transformation corresponds to a change of shapes of the mouth from "A" to "I" and that the second transformation corresponds to a change of shapes of the mouth from "I" to "U." When the symbol indicating the end of the symbol corresponding to the first transformation is the same as the symbol indicating the start of the symbol corresponding to the second transformation as in this case, it is considered that the sound corresponding to the coincident symbol was uttered at the time position of a joint between the first transformation and the second transformation. In the preceding example, the symbol representing the end of the symbol corresponding to the first transformation and the symbol representing the start of the symbol corresponding to the second transformation are both "2" and the same. In this case, it can be determined that the first transformation and the second transformation were continuously made.

When the symbol representing the end of the symbol corresponding to the first transformation is the same as the symbol representing the start of the symbol corresponding to the second transformation, the time position of the joint between the first transformation and the second transformation, and the symbol thereof are fed as mouth transformation unit position information J32 and as symbol information J33 corresponding to the mouth transformation unit, respectively, to an unrepresented output device (S34). The output device determines position information J34 of the mouth from the mouth transformation unit position information J32 and determines uttered word information J35 from the symbol information J33 corresponding to the mouth transformation unit. The change information recognition method is completed in this manner.

In the change information recognition apparatus 3 of the present embodiment, a transformation of the mouth in association with an utterance is divided in units of transformations from shapes of the mouth corresponding to six types of sounds including the five vowels and one nasal sound, to shapes of the mouth corresponding to the five types of the sounds except for that sound. For this reason, the change information recognition apparatus of the present invention is able to detect the position of the mouth from the input motion picture and to securely recognize which sound was uttered at which point of time, and it can be applied to utterance recognition apparatus. As the apparatus continuously recognizes uttered sounds, it is also able to recognize an uttered word.

The present embodiment is arranged to create the mouth basic transformation units from the six sounds of the vowels and nasal sound, but it is also possible to adopt a configuration wherein the mouth basic transformation units are created from all the 50 kana characters in Japanese. In this case, since the Japanese syllabary includes sixty eight sounds including the voiced consonants and p-sounds, 67×68 mouth basic transformation units will be used.

Figure 19:
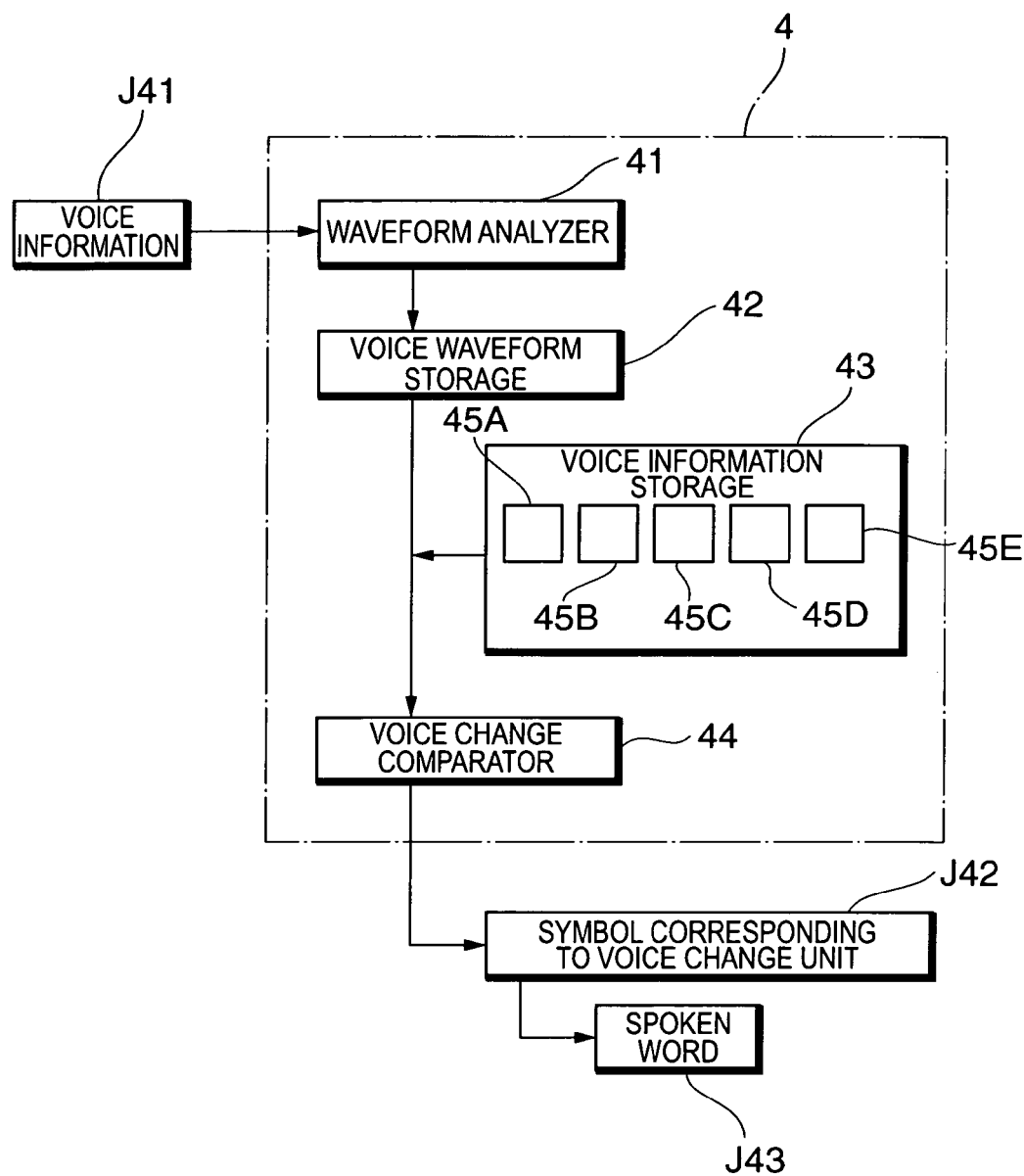
FIG. 19 is a block configuration diagram of a change information recognition apparatus according to the fourth embodiment.

Next, the fourth embodiment of the present invention will be described. FIG. 19 is a block configuration diagram of a change information recognition apparatus according to the present embodiment. The change information recognition apparatus of the present embodiment can be used as a voice change recognition apparatus. As shown in FIG. 19, the change information recognition apparatus 4 of the present embodiment is comprised of a waveform analyzing device 41, a voice waveform storing device 42, a voice information storing device 43, and a voice change comparing device 44.

The waveform analyzing device 41 is connected, for example, to an unrepresented microphone serving as a voice acquiring means, and the microphone acquires a voice uttered by a man. The microphone feeds acquired voice information J41 to the waveform analyzing device 41. The waveform analyzing device 41 analyzes the voice information J41 thus fed, for example, by wavelet transform thereof. Waveforms obtained by the wavelet analysis are fed to the voice waveform storing device 42. The voice waveform storing device 42 stores the waveforms thus fed.

Figure 20A:
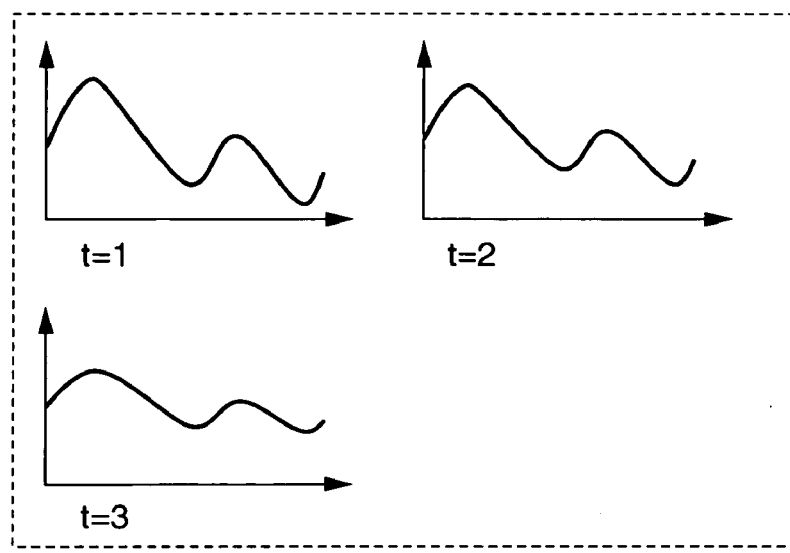
FIG. 20A depicts changes at times t=1-3 in a frequency-intensity graph of a certain voice.

The voice information storing device 43 has voice change unit storages 45A, 45B, . . . Each of the voice change unit storages 45A, 45B, . . . stores a basic voice change unit preliminarily stored as a voice change unit, and a symbol corresponding thereto. A basic voice change unit represents a change from a waveform of frequencies at phonation of an arbitrary phoneme to another waveform of frequencies at phonation of another arbitrary phoneme in an utterance. This basic voice change unit has, for example, frequency spectra shown in FIG. 20A or FIG. 20B. FIG. 20A depicts graphs showing frequency spectra at times t=1-3 in phonation of a certain voice, and FIG. 20B graphs showing frequency spectra at times t=1-3 in phonation of another voice. In each graph, the horizontal axis corresponds to the frequency, and the vertical axis to the intensity (spectral level) at each frequency. The graphs shown in FIGS. 20A, 20B are examples showing respective changes from a phoneme to another phoneme, and include sounds corresponding to the respective graphs at the times t=1-3; it is indicated in each figure that a sound corresponding to a certain phoneme is emitted at the time of t=1, and through the waveform at t=2 a sound corresponding to another phoneme at t=3 is emitted.

The voice waveform storing device 42 feeds the voice waveform information to the voice change comparing device 44, and the voice information storing device 43 feeds the basic sound change units and symbols corresponding thereto to the voice change comparing device 44. The voice change comparing device 44 compares the voice waveform information with the basic voice change units to recognize the voice. Furthermore, the voice change comparing device 44 is connected to an unrepresented output device, and feeds symbol information J42 corresponding to a detected voice change unit (a symbol corresponding to a detected voice change unit will be referred to hereinafter as a "voice change unit-corresponding symbol") to the output device.

Figure 21:
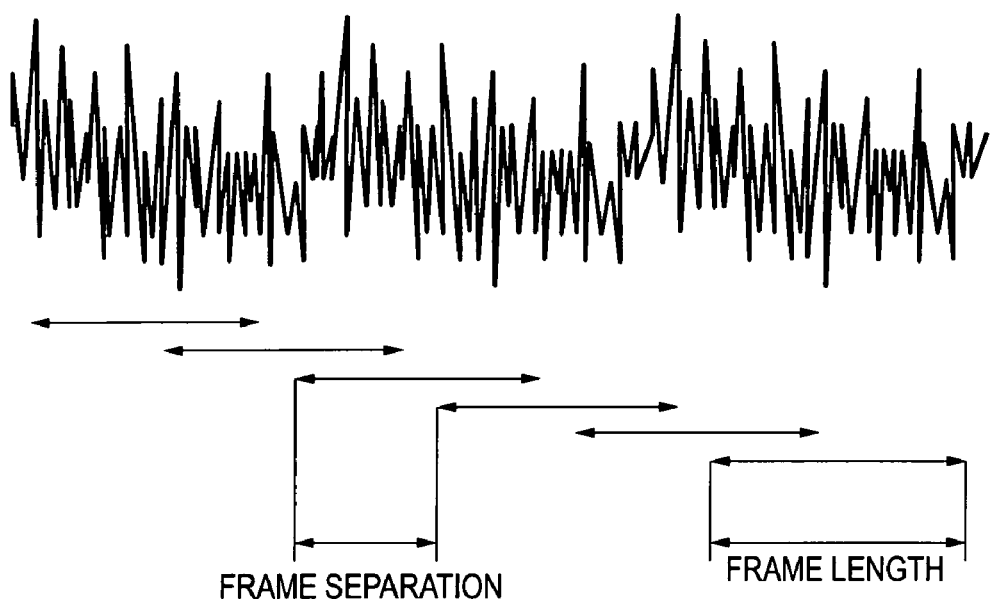
FIG. 21 is an illustration schematically showing voice change information cut into frames in the length of a fixed frame length, with a fixed frame spacing.
Figure 22A:
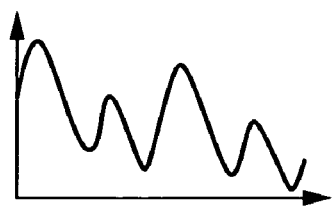
FIGS. 22A to 22H are graphs showing waveforms of voice change units created from voice change information cut at eight points of time T1-T8.
Figure 22B:
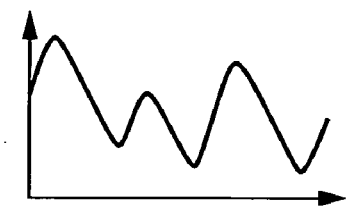
Figure 22C:
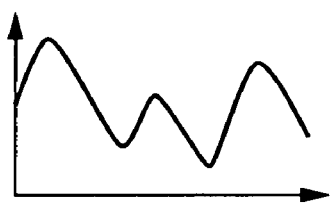
Figure 22D:
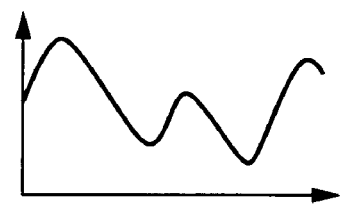
Figure 22E:
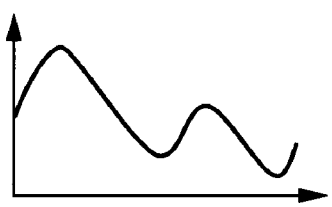
Figure 22F:
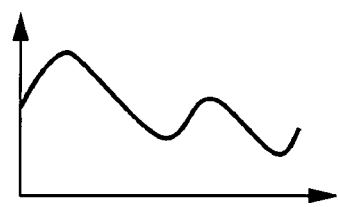
Figure 22G:
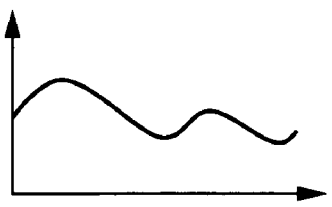
Figure 22H:
Figure 23A:
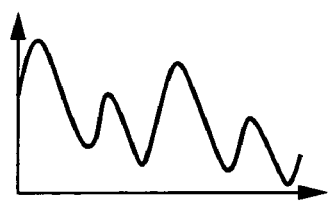
FIGS. 23A to 23H are explanatory illustrations showing portions coinciding with the graphs of voice change units in FIGS. 22A to 22H.
Figure 23B:
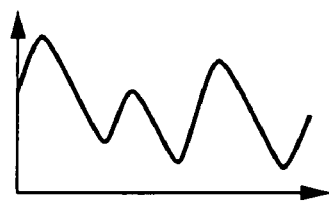
Figure 23C:
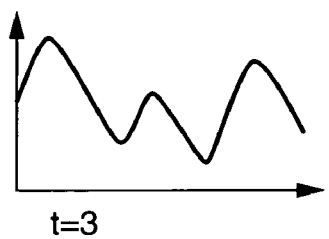
Figure 23D:
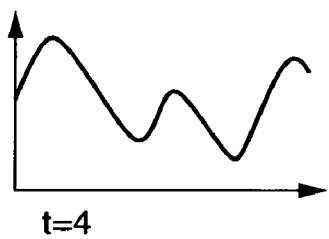
Figure 23E:
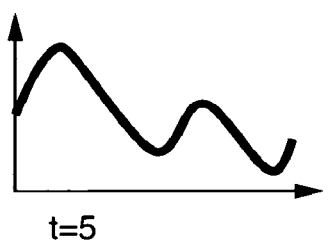
Figure 23F:
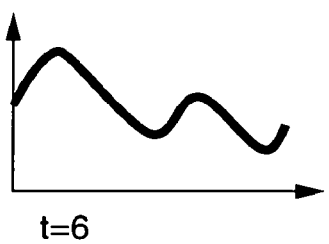
Figure 23G:
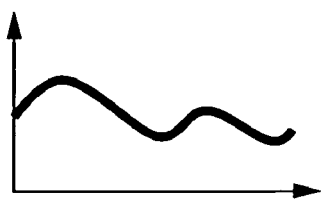
Figure 23H:
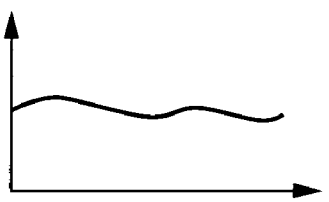

Now, let us explain a transformation information recognition method by the change information recognition apparatus 4 according to the present embodiment. In the change information recognition apparatus 4 of the present embodiment, the voice information J41 acquired by the microphone or the like is subjected to the wavelet analysis to create voice change units. The voice change units are compared with the basic voice change units preliminarily stored, to recognize a change of the voice. For example, suppose the voice change information is acquired by the microphone and is fed to the waveform analyzing device 41. The waveform analyzing device 41, as shown in FIG. 21, cuts the voice change information in a fixed frame length, e.g., in the frame length having the length of 30 msec, with a certain frame spacing, e.g., at intervals of 10 msec, to create a plurality of voice change units. FIGS. 22A to 22H show respective waveforms of voice change units created from eight clipped voice change information pieces at times of t1-t8.

Figure 20B:
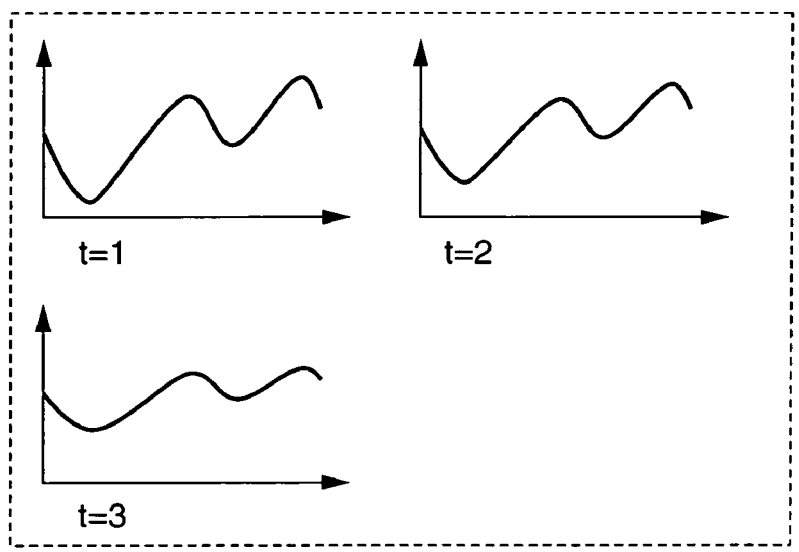
FIG. 20B depicts changes at times t=1-3 in a frequency-intensity graph of another voice.

After the waveforms of such voice change units are created, these voice change units are compared with the basic voice change units stored in the voice information storing device 43 and shown in FIG. 20. When the result of the comparison is that the voice change units shown in FIGS. 22A to 22H include a portion having the same waveform as the basic voice change unit shown in FIG. 20A or 20B, it can be determined that the voice indicating the basic voice change unit is uttered. In the example shown in FIGS. 22, the waveforms of FIGS. 23E to 23G (the waveforms at t=5-7) coincide with the waveforms shown in FIG. 20A (the waveforms at t=1-3), as shown in FIGS. 23. It is, therefore, understood that the same voice as the voice corresponding to the basic voice change unit shown in FIG. 20A is uttered in this portion. When a coincident or similar portion is present through the comparison between the voice change units and the basic voice change units as described above, it is found that the voice corresponding to the basic voice change unit is uttered.

Figure 24:
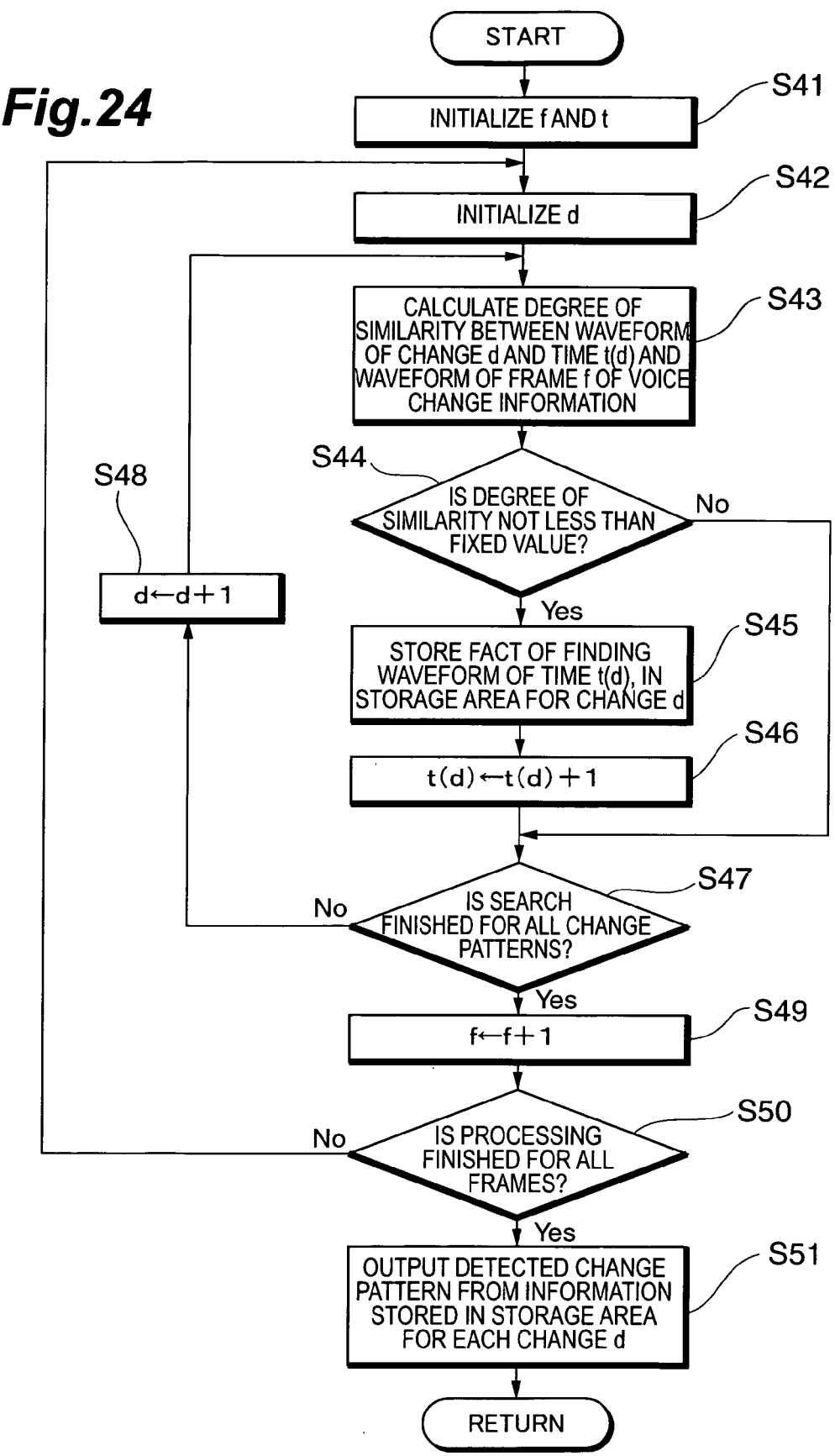
FIG. 24 is a flowchart showing a procedure of a transformation information recognition method according to the fourth embodiment.

Subsequently, a specific change information recognition method of the present invention will be described. FIG. 24 is a flowchart showing a procedure of a transformation information recognition method according to the present embodiment. The voice information acquired by the unrepresented microphone or the like is fed to the waveform analyzing device 41 of the change information recognition apparatus 4. The waveform analyzing device 41 subjects the voice to the wavelet analysis; for example, it divides the voice into eight waveforms shown in FIG. 22, to create voice change units consisting of eight frames. The waveform analyzing device 41 feeds the created voice change units to the voice waveform storing device 42. The voice waveform storing device 42 stores these voice change units.

The voice information storing device 43 stores a plurality of basic voice change units. The voice waveform storing device 42 feeds the stored voice change units to the voice change comparing device 44 and the voice information storing device 43 feeds the stored basic sound change units and symbols corresponding thereto to the voice change comparing device 44. The voice change comparing device 44 compares the voice change units fed from the voice waveform storing device 42, with the basic voice change units fed from the voice information storing device 43.

Before performing the comparison between them, a variable indicating a frame number of each voice change unit and a variable indicating a time thereof are first initialized to frame f=1 and time t=1 (S41). Next, a variable indicating basic voice change information is initialized to change pattern d=1 (S42). A plurality of change patterns including the two change patterns shown in FIGS. 20A, 20B are stored as such change patterns. The number of change patterns is determined based on the number of phonemes; for example, where the number of phonemes is n, the number of change patterns can be determined as n×(n-1).

Next, the degree of similarity is calculated between the waveform at the time t(d)=1 in the change pattern d=1 and the waveform of the frame f=1 in the voice change unit (S43). It is then determined whether the degree of similarity as a result is not less than a fixed value (S44), and, when the degree of similarity is determined to be not less than the fixed value, the fact that the waveform at the time t(d) was found, and the found time (or frame number) are stored in a storage area for the charge pattern d (S45). Then, stored is such information that the pattern of t(d)=2 is a target at the next time t=2. Then an increment of 1 is given to the time t(d)=1 in the change pattern d=1 to obtain t(d)+1(=2) (S46). It is then determined whether the search for a similar pattern is finished for all the change patterns (S47). Since the processing for the change pattern d=2 shown in FIG. 20B is not finished yet herein, it is determined that the search process for a similar pattern is not finished yet, and an increment is given to the change pattern to obtain d+1 (S48).

When the search process for a similar pattern is finished for all the change patterns in this manner and when it is determined at step S47 that the process is finished for all the change patterns, an increment of 1 is given to frame f=1 to obtain the next frame f+1(=2) (S49). It is then determined whether the process is finished for all the frames f(=1-8) (S50). When it is determined that the process is not finished yet, the flow returns to step S42 to again initialize the change pattern and to perform the calculation of the degree of similarity (S43). When it is determined on the other hand that the process is finished for all the frames f(=1-8), a detected change pattern is fed from the information stored in a storage area for each change pattern (S51). By processing the change patterns in this manner, for example, the basic voice change unit shown in FIG. 20A can be detected from the voice change units shown in FIGS. 22.

Figure 25:
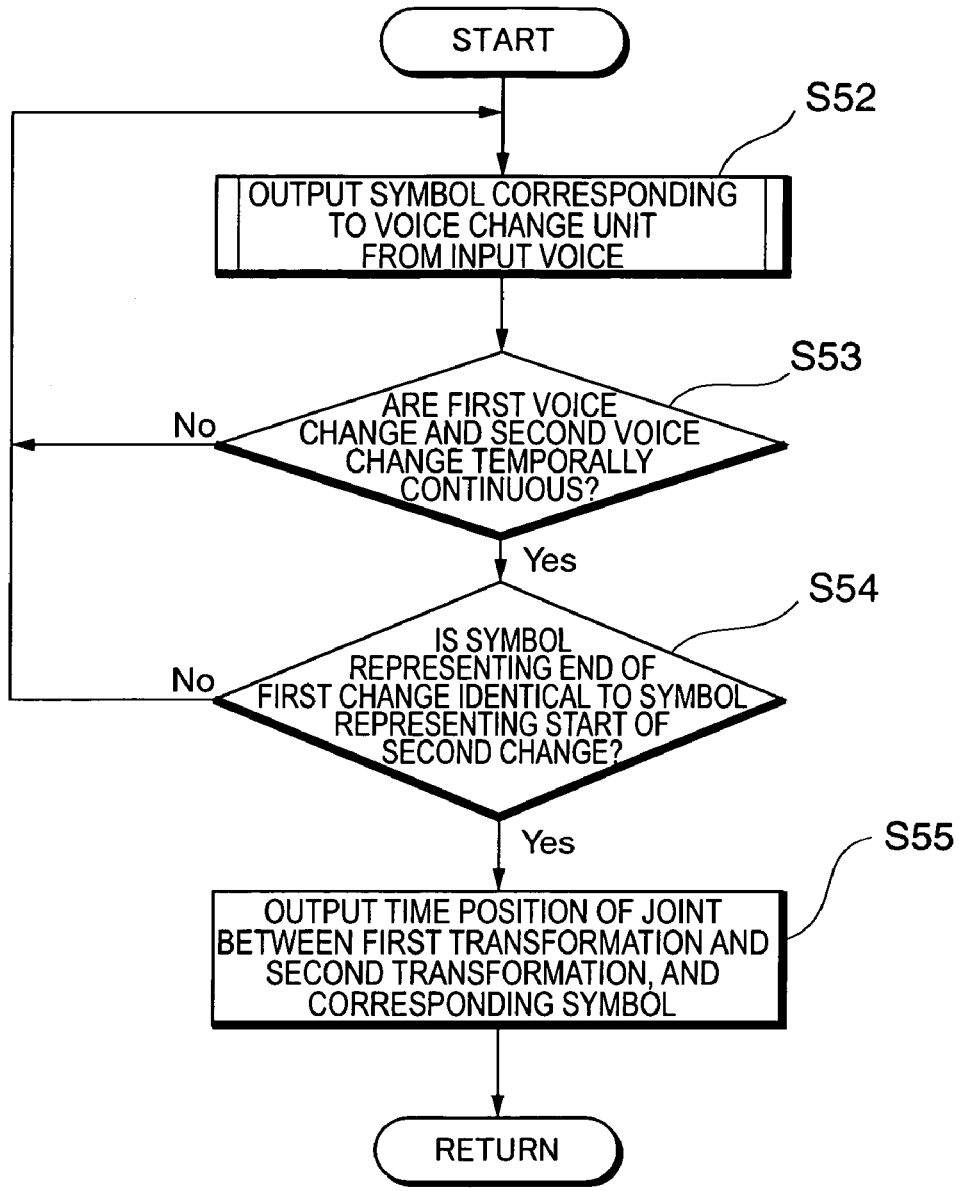
FIG. 25 is a flowchart showing a procedure of voice recognition according to the fourth embodiment.

After voice change units are detected in this manner, the processing shown in FIG. 25 is carried out to recognize the contents of the utterance. FIG. 25 is a flowchart showing a procedure of voice recognition according to the present embodiment.

After the voice change units are detected in accordance with the flowchart shown in FIG. 24, as shown in FIG. 25, the voice change unit-corresponding symbol information J42 (FIG. 19) is fed based on the input voice change units to an unrepresented output device (S52). The output device refers to the voice change unit-corresponding symbol information J42 fed from the voice change comparing device 44 to determine whether a first voice change unit-corresponding symbol and a second voice change unit-corresponding symbol are temporally continuous, among the symbols corresponding to the plurality of output voice change units (S53).

When the result of the determination is that they are not temporally continuous, the flow returns to step S52 to repeat the same processing. When it is determined on the other hand that they are temporally continuous, it is determined whether a symbol representing an end of the first voice change unit-corresponding symbol is the same as a symbol representing a start of the second voice change unit-corresponding symbol (S54). For example, in a case where the first voice change unit-corresponding symbol is one varying from phoneme A to phoneme B and where the second voice change unit-corresponding symbol is one varying from phoneme B to phoneme C, it is determined that the symbol representing the end of the first voice change unit-corresponding symbol coincides with the symbol representing the start of the second voice change unit-corresponding symbol. For example, in another case where the first voice change unit-corresponding symbol is one varying from phoneme A to phoneme B and where the second voice change unit-corresponding symbol is one varying from phoneme A to phoneme C, it is determined that the symbol representing the end of the first voice change unit-corresponding symbol does not coincide with the symbol representing the start of the second voice change unit-corresponding symbol.

When the result of the determination is that the symbol representing the end of the first voice change unit-corresponding symbol does not agree with the symbol representing the start of the second voice change unit-corresponding symbol, the flow returns to step S52 to repeat the same processing. When it is determined on the other hand that the symbol representing the end of the first voice change unit-corresponding symbol agrees with the symbol representing the start of the second voice change unit-corresponding symbol, the device outputs a symbol corresponding to a time position of a joint between the first voice change unit-corresponding symbol and the second voice change unit-corresponding symbol (S55). In the above-described example, it is determined that phoneme B is present between the first voice change unit-corresponding symbol and the second voice change unit-corresponding symbol.

Through repetitions of the processing as described above, a spoken word J43 (FIG. 19) can be recognized.

In the change information recognition apparatus 4 of the present embodiment, as described above, the acquired voice is divided into voice change units and the voice change units are compared with the basic voice change units to detect the voice. For this reason, it is feasible to securely recognize a spoken word or the like.

Next, the fifth embodiment of the present invention will be described. The present embodiment is directed to recognition of a body change with movement and transformation of each part of a body like gesture recognition, pedestrian recognition, and expression recognition, as change information.

Figure 26:
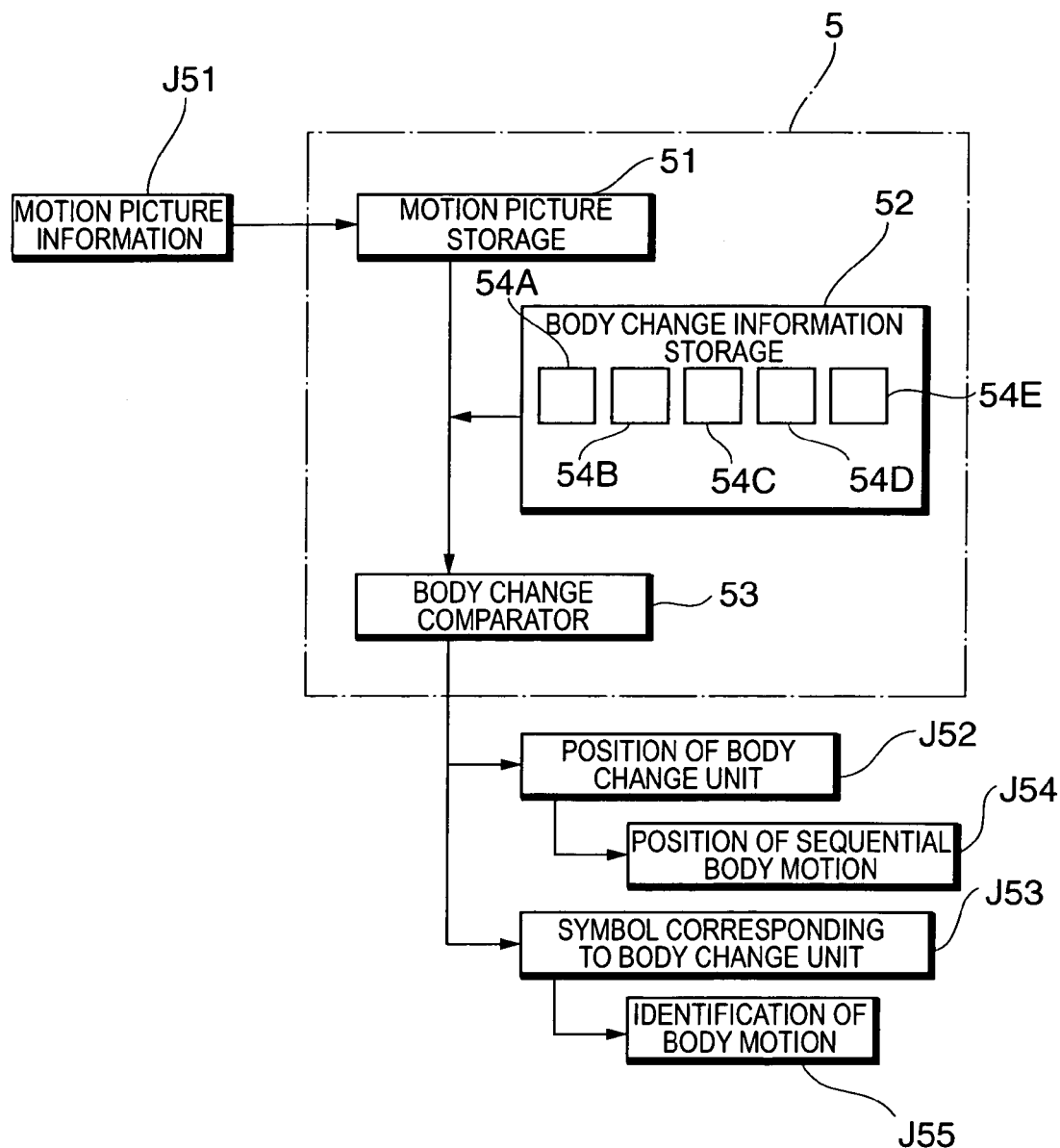
FIG. 26 is a block configuration diagram of a change information recognition apparatus according to the fifth embodiment.

FIG. 26 is a block configuration diagram of a change information recognition apparatus according to the present embodiment. As shown in FIG. 26, the change information recognition apparatus 5 of the present embodiment is comprised of a motion picture storing device 51, a body change information storing device 52, and a body change comparing device 53. This change information recognition apparatus 5 can be used as a body change recognition apparatus, a pedestrian recognition apparatus, an expression recognition apparatus, or the like.

The motion picture storing device 51 is connected to an unrepresented motion picture taking device. This motion picture taking device takes a motion picture of a body of a man as a recognition object, and the motion picture taking device feeds taken motion picture information J51 to the motion picture storing device 51.

The body change information storing device 52 has a plurality of body change unit storages 54A, 54B, . . . preliminarily storing patterns that can be made by motions of a human body. Each body change unit storage 54A, 54B, . . . preliminarily stores a basic body change unit representing a motion of the human body.

The motion picture storing device 51 feeds the body change unit information to the body change comparing device 53 and the body change information storing device 52 feeds the basic body change unit information to the body change comparing device 53. The body change comparing device 53 compares the body change unit information with the basic body change unit information to recognize a motion of a body of a man. Furthermore, the body change comparing device 53 is connected to an unrepresented output device and feeds a position of the body of the man on the image fed from the motion picture storing device 51, as position information J52 of a body change unit to the output device. At the same time as it, the body change comparing device 53 outputs symbol information J53 corresponding to the body change unit, to the output device. The output device determines position information J54 of the mouth from the position information J52 of the body change unit and determines identification information J55 of the body motion from the symbol information J53 corresponding to the body change unit.

Figure 27:
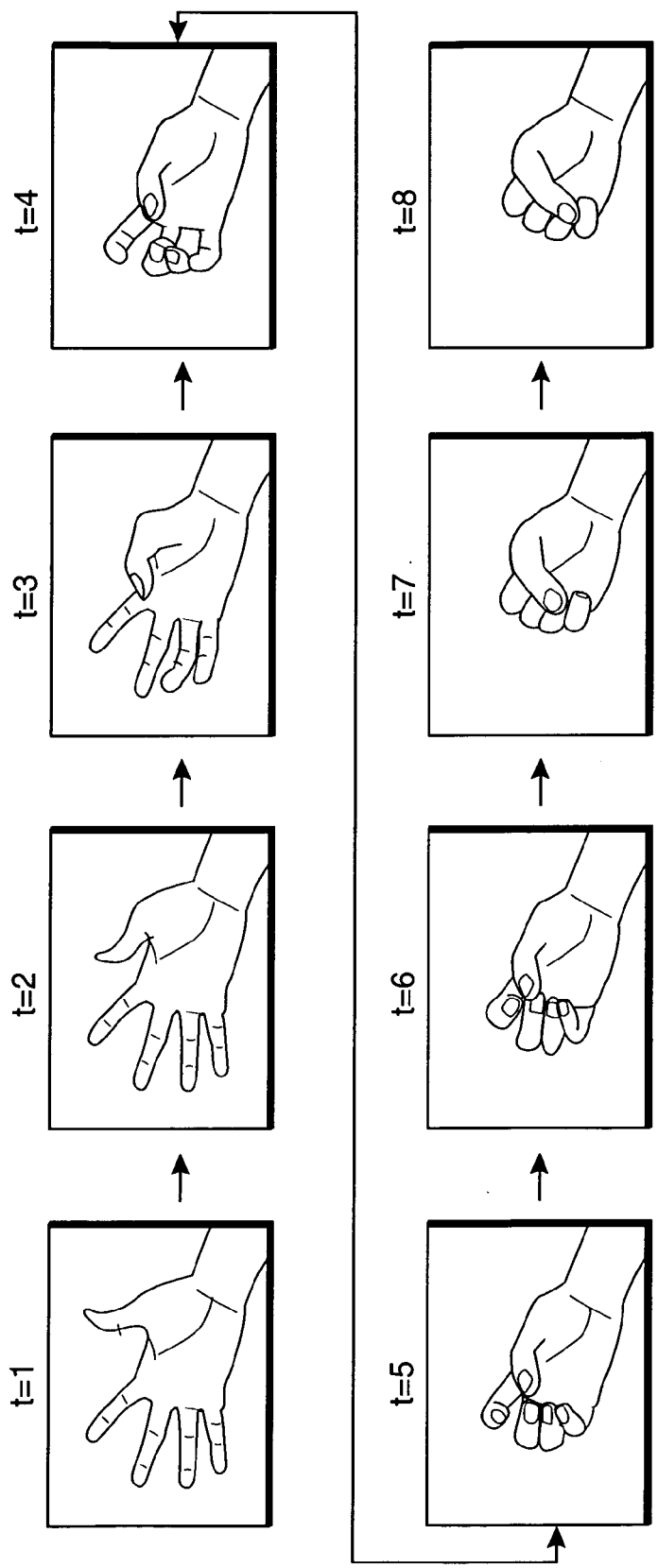
FIG. 27 is an illustration schematically showing an example of images at respective times of basic body change units in gesture recognition.

Each of the body change unit storages 54A, 54B, . . . stores a shape of a basic body change unit indicating a change of a hand, a leg, an arm, or the like corresponding to a motion picture showing a motion of a man, and symbol information corresponding to the shape. For example, FIG. 27 shows an example of images at times t=1-8 of basic body change units used in gesture recognition. In the example of the basic body change units shown in FIGS. 27A to 27H, an open state of a right hand is shown at the time t=1, and a procedure from the open hand state to closing of the hand at the time t=8 is continuously shown.

In the change information recognition apparatus 5 of the present embodiment, a position of a body of a man and a motion of the body (body motion) can be recognized by a method similar to the change information recognition method by the change information recognition apparatus 3 of the third embodiment described above. Specifically, a position of a body change unit and a body motion can be recognized by replacing the mouth basic transformation information storing device 32 of the third embodiment with the body change information storing device 52 of the present embodiment, replacing the mouth transformation state comparing device 33 with the body change comparing device 53, and performing processing according to a procedure similar to the flowchart shown in FIG. 17.

In this manner, a position of a hand or an arm, and a symbol corresponding to a gesture can be obtained based on a motion picture fed from the motion picture taking device, and what gesture is indicated can be identified from the symbol.

The change information recognition apparatus 5 is also applicable to recognition of a position of a pedestrian on a motion picture and a motion thereof. FIGS. 28 show an example of images at times t=1-10 of basic body change units used in the recognition of the pedestrian. In the example of the basic body change units shown in FIGS. 28A to 28J, a posture of a pedestrian is shown at the time t=1, and a motion starting from the posture to a posture of the pedestrian at the time t=10 is continuously shown. These images of the pedestrian shown in FIGS. 28A to 28J are preliminarily stored in the respective body change unit storages 54A, 54B, . . . in the body change information storing device 52.

In the example shown in FIGS. 28, a walking motion of a man (body motion) can be recognized by a method similar to that by the change information recognition apparatus 3 of the third embodiment. In this case, a position of a body change unit and a body motion can also be recognized by performing processing according to a procedure similar to the flowchart shown in FIG. 17. In this manner, the position of the pedestrian and a motion situation of the pedestrian can be identified based on the motion picture fed from the motion picture taking device.

It is also feasible to recognize a change in expressions of a man by the change information recognition apparatus 5 of the present embodiment, though not illustrated. The human emotions include delight, anger, sorrow, and pleasure, and a man has expressions according to those emotions, or an emotionless expression. By preparing 5×4 change information units like a change from the emotionless expression to delight and a change from anger to sorrow, from five images of the face corresponding to delight, anger, sorrow, pleasure, and the emotionless expression as described above, it is also feasible to recognize a position of a face in a motion picture and an expression of the face.

Next, the sixth embodiment of the present invention will be described. The present embodiment is directed to recognition of a position of a rotating object and a change with rotation thereof while the object as a recognition object is in rotation.

Figure 29:
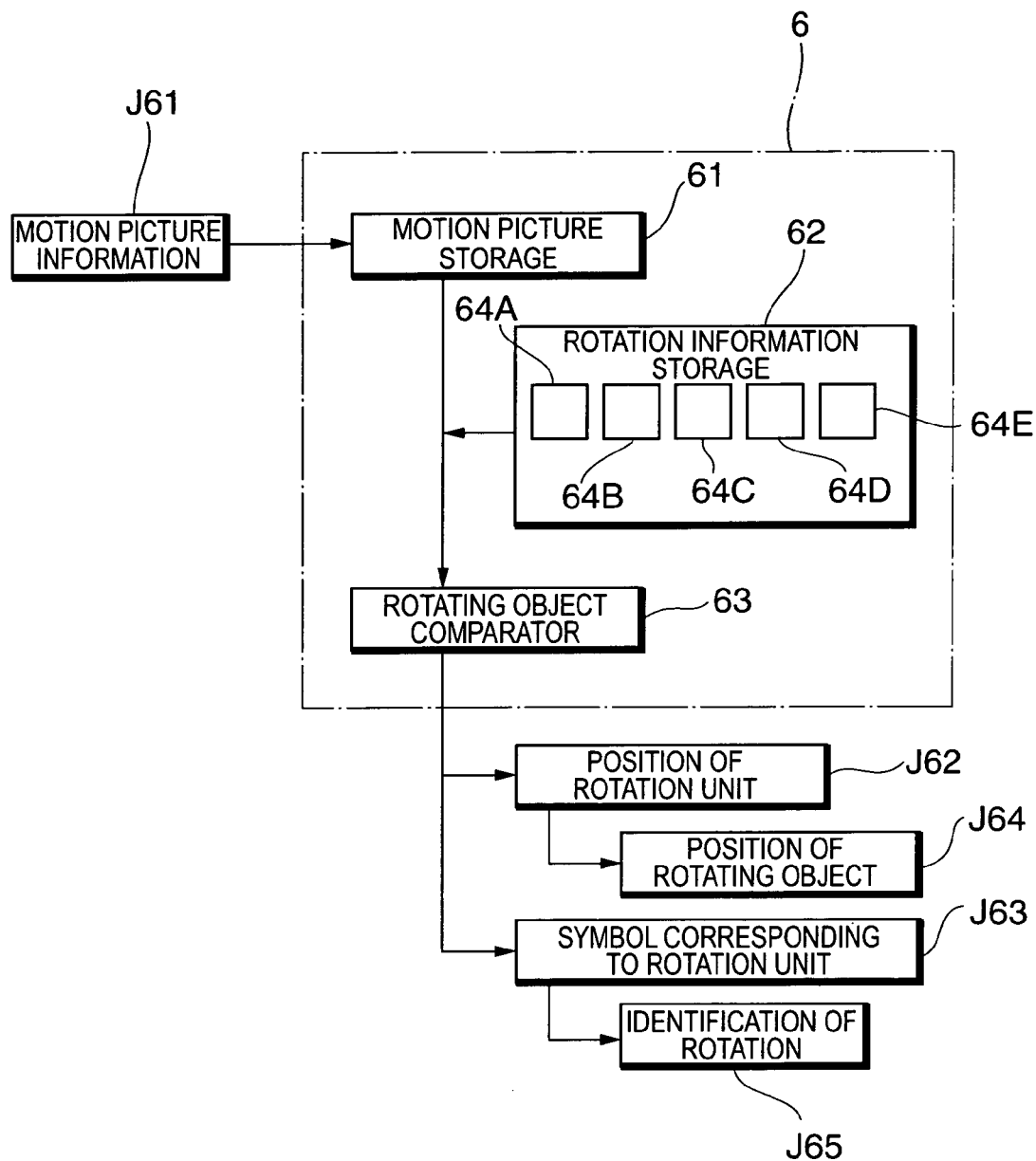
FIG. 29 is a block configuration diagram of a change information recognition apparatus according to the sixth embodiment.

FIG. 29 is a block configuration diagram of a change information recognition apparatus according to the present embodiment. As shown in FIG. 29, the change information recognition apparatus 6 of the present embodiment is comprised of a motion picture storing device 61, a rotation information storing device 62, and a rotating object comparing device 63. The change information recognition apparatus 6 of the present embodiment can be used as a rotating object recognition apparatus.

The motion picture storing device 61 is connected to an unrepresented motion picture taking device. This motion picture taking device takes a motion picture of a rotating recognition object, e.g., a head of a man, as an object to be recognized. This motion picture taking device feeds taken motion picture information J61 to the motion picture storing device 61.

The rotation information storing device 62 has a plurality of rotation unit storages 64A, 64B, . . . preliminarily storing rotation patterns of the rotating recognition object. The rotation unit storages 64A, 64B, . . . preliminarily store the basic rotation units representing rotation of the recognition object.

The motion picture storing device 61 feeds rotation unit information to the rotating object comparing device 63 and the rotation information storing device 62 feeds basic rotation unit information to the rotating object comparing device 63. The rotating object comparing device 63 compares the rotation unit information with the basic rotation unit information to recognize a change with rotation of a head of a man, for example. Furthermore, the rotating object comparing device 63 is connected to an unrepresented output device, and feeds the position of the head of the man on the image fed from the motion picture storing device 61, as position information J62 of the rotation unit to the output device. At the same time as it, the comparing device feeds symbol information J63 corresponding to the rotation unit, to the output device. The output device determines position information J64 of the head of the man being the rotating object, from the position information J62 of the rotation unit, and determines identification information J65 of rotation from the symbol information J63 corresponding to the rotation unit.

Figure 30:
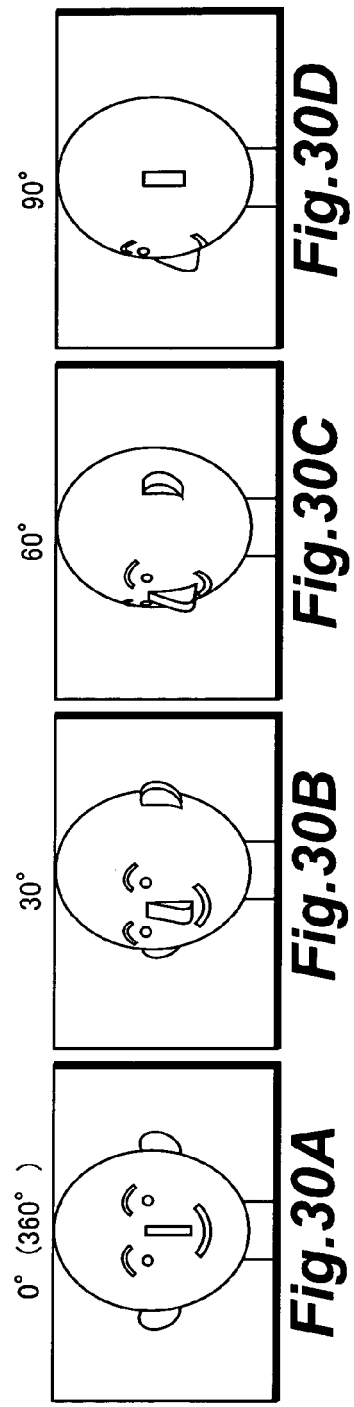
FIGS. 30A to 30L are illustrations schematically showing images in rotation of a head of a doll.

Each of the rotation unit storages 64A, 64B, . . . stores a shape of a rotation change unit indicating a change in the direction of the head corresponding to a motion picture showing rotation of the head of the man, and symbol information corresponding to the shape. FIGS. 30A to 30L schematically show images in rotation of a head part of a doll. Among these, let us define a first rotation as a rotation from 0° to 120° as shown in FIGS. 30A to 30E, a second rotation as a rotation from 120° to 240° as shown in FIGS. 30E to 30I, and a third rotation as a rotation from 240° to 360° (0°) as shown in FIGS. 30I to 30L and in FIG. 30A. Conversely, let a fourth rotation be a rotation from 360° (0°) to 240° as shown in FIG. 30A to FIGS. 30L-30I, a fifth rotation be a rotation from 240° to 120° as shown in FIGS. 30I to 30E, and a sixth rotation be a rotation from 120° to 0° as shown in FIGS. 30E to 30A. The images of these first rotation to sixth rotation and symbols corresponding thereto are stored in the respective rotation unit storages 64A, 64B, . . .

In the change information recognition apparatus 6 of the present embodiment, a position of a rotation unit consisting of a rotating recognition object, and a rotation motion thereof can be recognized by a method similar to the change information recognition method by the change information recognition apparatus 3 of the third embodiment. Specifically, the position of the rotation unit and the rotation motion can be recognized by replacing the mouth basic transformation information storing device 32 in the third embodiment with the rotation information storing device 62 of the present embodiment, replacing the mouth transformation state comparing device 33 with the rotating object comparing device 63, and performing processing according to a procedure similar to the flowchart shown in FIG. 17.

The position of the rotating recognition object, and the symbol corresponding to the rotation unit can be obtained based on the motion picture fed from the motion picture taking device, and it is feasible to identify in which rotating state the recognition object is, from the symbol.

Figure 31:
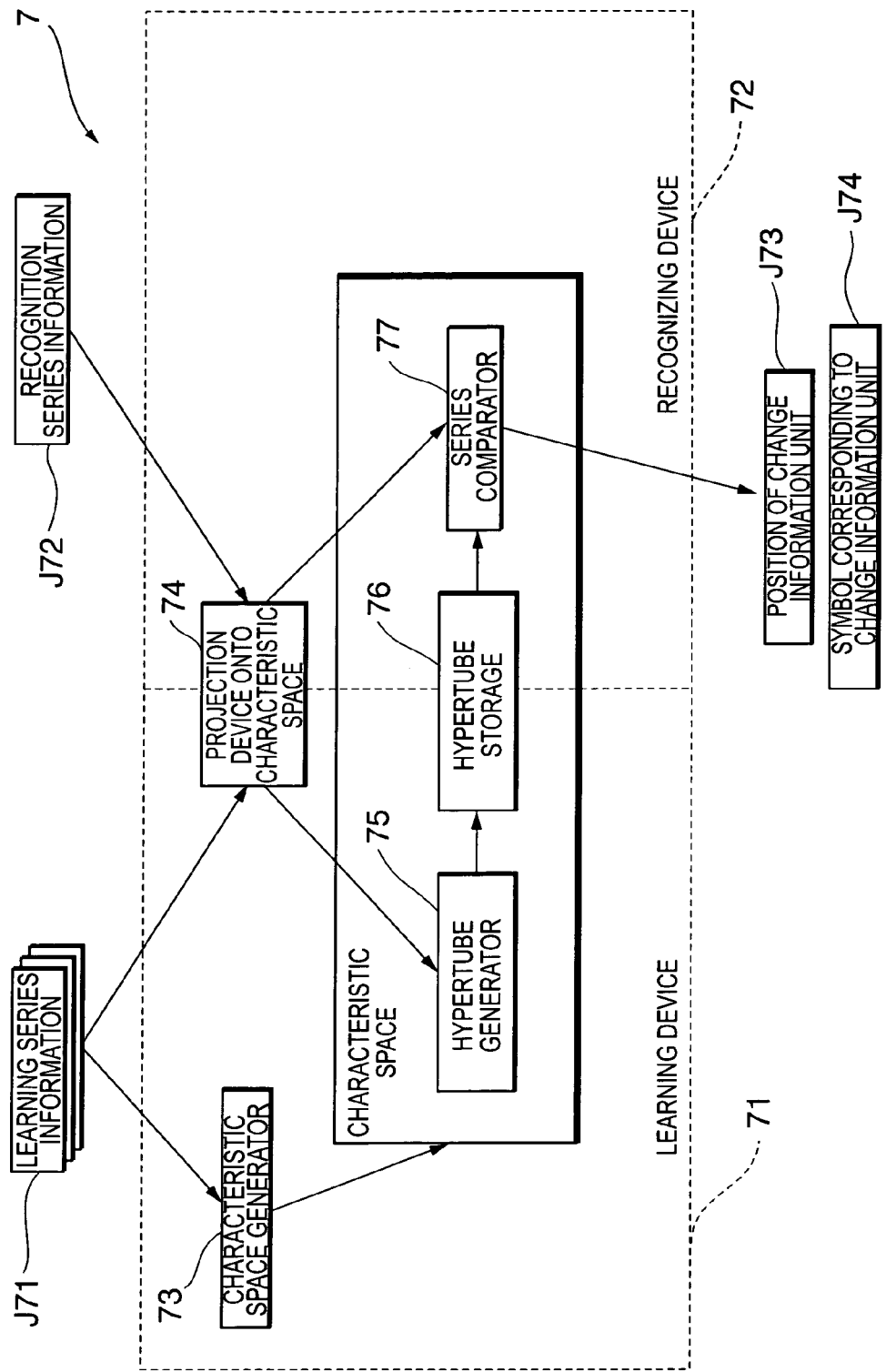
FIG. 31 is a block configuration diagram of a change information recognition apparatus according to the seventh embodiment.

Next, the seventh embodiment of the present invention will be described. FIG. 31 is a block configuration diagram of a change information recognition apparatus according to the present embodiment. As shown in FIG. 31, the change information recognition apparatus 7 of the present embodiment is comprised of a learning device 71 and a recognizing device 72. The learning device 71 is provided with a feature space generator 73 and a projection device 74. The projection device 74 is used in both of the learning device 71 and the recognizing device 72.

Learning series information J71 prepared in advance is fed to the feature space generator 73 in the learning device 71. The feature space generator 73 is equipped, for example, with approximately 30 pieces of learning series information J71 prepared as samples, and the feature space generator 73 generates a feature space from these pieces of learning series information J71.

The projection device 74 is connected to the feature space generator 73 and to an unrepresented motion picture taking device. The feature space generator 73 feeds feature space generation information for generation of a feature space, to the projection device 74. The unrepresented motion picture taking device takes a motion picture of a face including a mouth as a recognition object, and feeds the motion picture of the face thus taken, as recognition series information J72. The projection device 74 generates a projective locus obtained by projection of the motion picture onto the feature space, based on the motion picture of the face (recognition series information J72) fed from the motion picture taking device.

The learning device 71 is provided with a hypertube generator 75 for generating a tubular model (hereinafter referred to as a "hypertube") described later, in the feature space, and a hypertube storage 76 is also provided for use in both of the learning device 71 and the recognizing device 72. Furthermore, the recognizing device 72 is provided with a series comparator 77 for recognizing a change of the hypertube on the feature space. The projection device 74 feeds the projective locus of the motion picture as projective locus information to the hypertube generator 75 and to the series comparator 77.

The hypertube generator 75 generates a hypertube on the feature space from the projective locus information of the motion picture fed from the projection device 74 and feeds it as hypertube information to the hypertube storage 76. The hypertube storage 76 stores the hypertube information fed from the hypertube generator 75, and a symbol corresponding to each hypertube. The hypertube storage 76 feeds the stored hypertube information and the symbol corresponding to each hypertube to the series comparator 77. The series comparator 77 compares the projective locus fed from the projection device 74, with the hypertube information fed from the hypertube storage 76 to determine a position of a change information unit and a symbol corresponding thereto. In addition, the comparator feeds them as change information unit position information J73 and as change information-corresponding symbol information J74, respectively, to an unrepresented output device.

Figure 32:
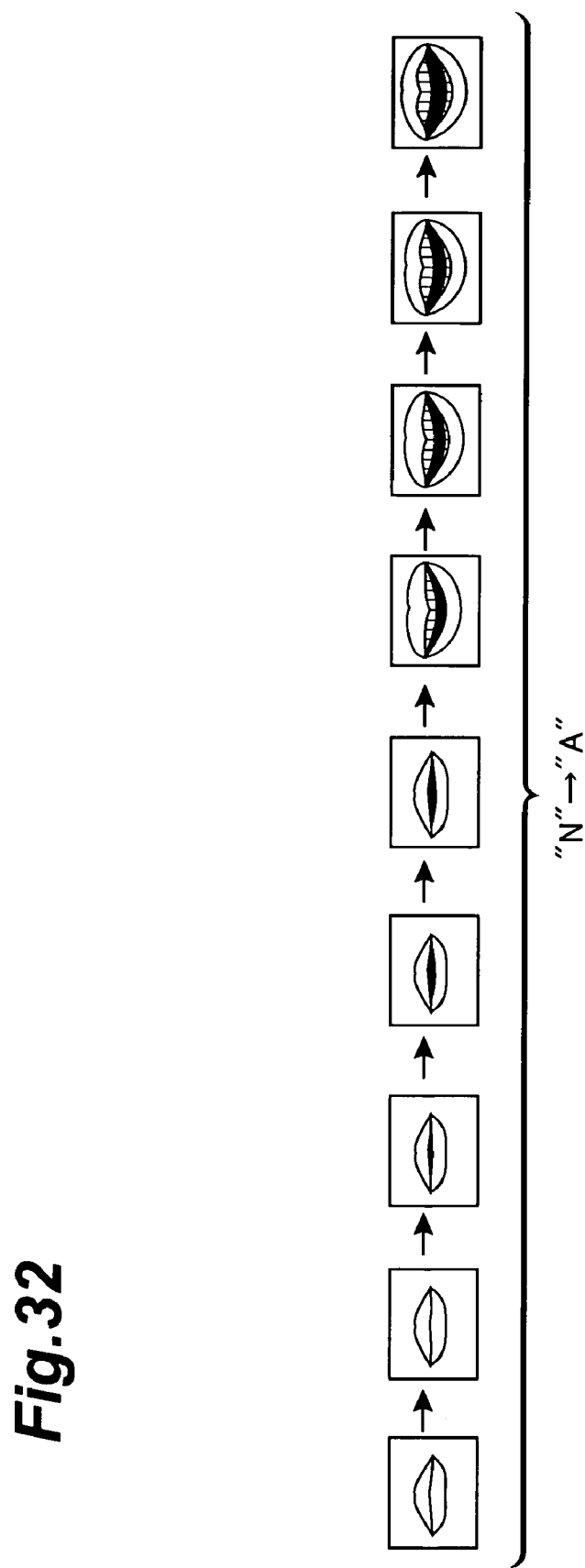
FIG. 32 is an illustration schematically showing a motion picture representing a motion of a mouth uttering from "N" to "A."
Figure 33:
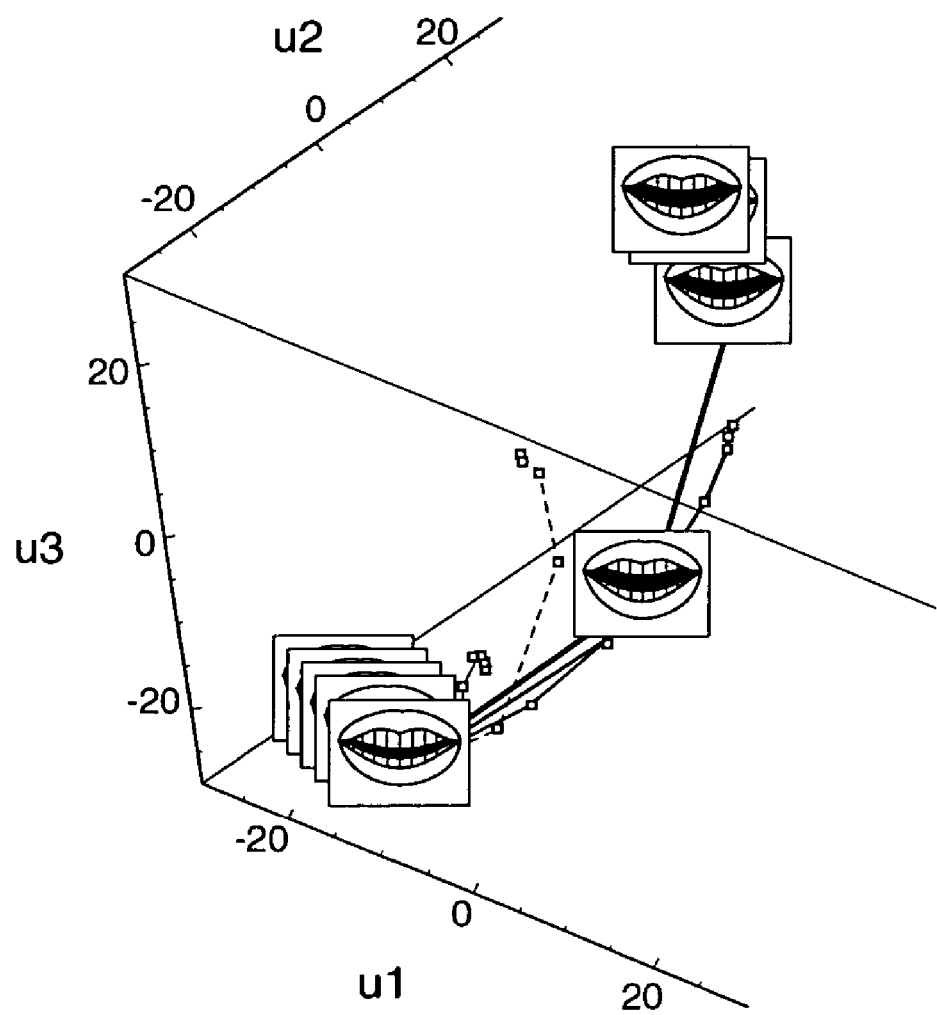
FIG. 33 is an illustration showing a graph on a feature space created based on the motion picture shown in FIG. 32.

The feature space generator 73 of the present embodiment extracts predetermined characteristic quantities from an image to express it by a feature space. For example, where characteristic quantities of one image are expressed by a three-dimensional vector, one image is expressed as a point on a three-dimensional space. Under this premise, for example, an input motion picture is one showing a motion of a mouth uttering "N" to "A" shown in FIG. 32, and each of images constituting the motion picture is plotted on the three-dimensional space This results in expressing the nine images representing this motion picture, as a locus on the feature space obtained by connecting points of those images in order of time.

There are no particular restrictions on the characteristic quantities, but they can be, for example, projective components onto a space (eigenspace) whose basis consists of eigenvectors corresponding to superordinate eigenvalues obtained by the principal component analysis. For example, where an image is assumed to be a vector, a grayscale image of 16 pixels vertical×16 pixels horizontal can be expressed as a 16×16=256-dimensional vector having gray values as respective elements. Then a number of images expressed as vectors are used as learning series information J71, a variance-covariance matrix is obtained of those vectors of learning series information J71, and then eigenvalues corresponding to eigenvectors thereof are determined. Then three eigenvectors are extracted from those eigenvectors in descending order of eigenvalues from the largest, and a space spanned by these three vectors is defined as a feature space (eigenspace). Let us consider a point having, as values on respective axes, components resulting from projection of 256-dimensional vector data in the learning series information J71 onto the feature space. Then one image that can be expressed as a certain point on the 256-dimensional space can be expressed as a point on the three-dimensional space.

This will be described in further detail. For example, a plurality of images representing motion pictures of transformation units of the thirty patterns shown in FIG. 14 are prepared by the number of some people, as the learning series information J71. In the case of a transformation unit being one pattern out of them, e.g., a transformation unit represented by symbol 12, a transformation of shapes of the mouth to transform from the shape of the mouth uttering "A" to the shape of the mouth uttering "I" is expressed by several consecutive images. For each of the transformation units of the thirty patterns shown in FIG. 14, pieces of learning series information J71 are prepared by the number of some people, and a feature space (eigenspace) is determined from these pieces of learning series information J71.

The feature space determined herein is a space that can express images of the mouth by a smaller information content through the use of the learning series information J71. On this feature space, images representing an apparently slight transformation are projected to points at positions close to each other in the feature space.

Next, the generation of hypertube will be described.

Figure 34:
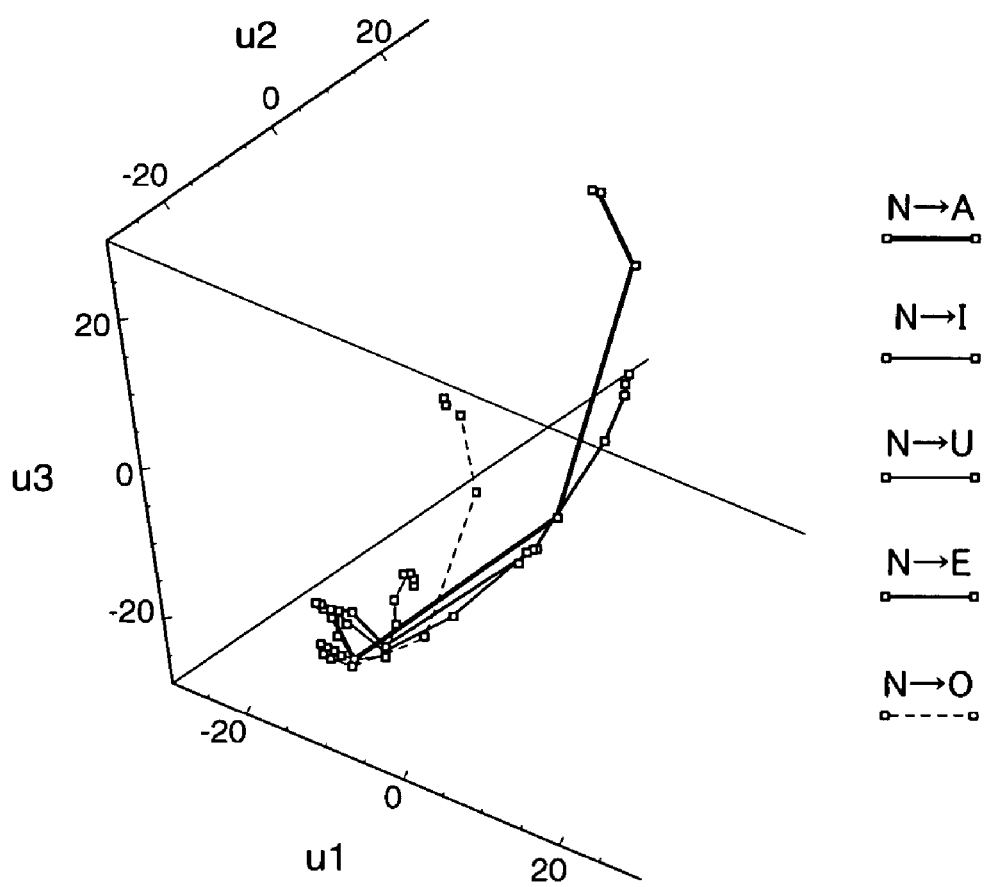
FIG. 34 is an illustration showing a graph on a feature space created based on the motion picture, including other transformation patterns.

After the feature space generator 73 generates the feature space, the learning series information J71 is fed to the projection device 74. The projection device 74 projects the learning series information J71 onto the generated feature space to generate projective loci. FIG. 34 shows a three-dimensional feature space, and shows on this feature space, for example, a polygonal curve indicating a transformation from "N" to "A," a polygonal curve indicating a transformation from "N" to "I," a polygonal curve indicating a transformation from "N" to "U," a polygonal curve indicating a transformation from "N" to "E," and a polygonal curve indicating a transformation from "N" to "O." Then these loci (polygonal curves) are expressed as smooth curves.

As might be expected, the shape of the mouth is slightly different among people even with an utterance of the same sound, and the opening degree and shape of the mouth also slightly differ. Therefore, the same utterance is not expressed by the same locus on the feature space, and has some variation. For example, the curves shown in FIG. 35 indicate curves C1-C6 obtained by projection of the motion of the mouth onto the feature space with a certain utterance of some people (six people). As seen in these curves C1-C6, the loci on the feature space are not completely identical, but have some variation.

Figure 36:
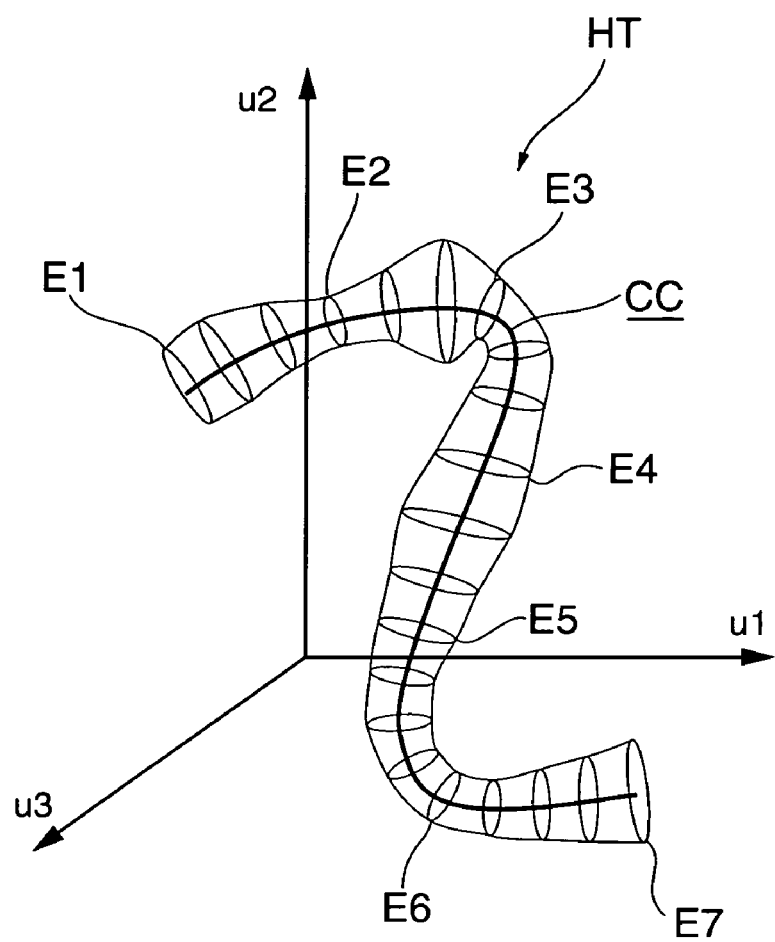
FIG. 36 is an illustration showing a hypertube created on a feature space.

Then, as shown in FIG. 36, a curve CC is set as a representative curve for a plurality of loci representing the same transformation, and the variation around the representative locus is expressed by radii of circles E1, E2, . . . , whereby a tubular model can be constructed. This tubular model can be defined as a hypertube HT.

Figure 35:
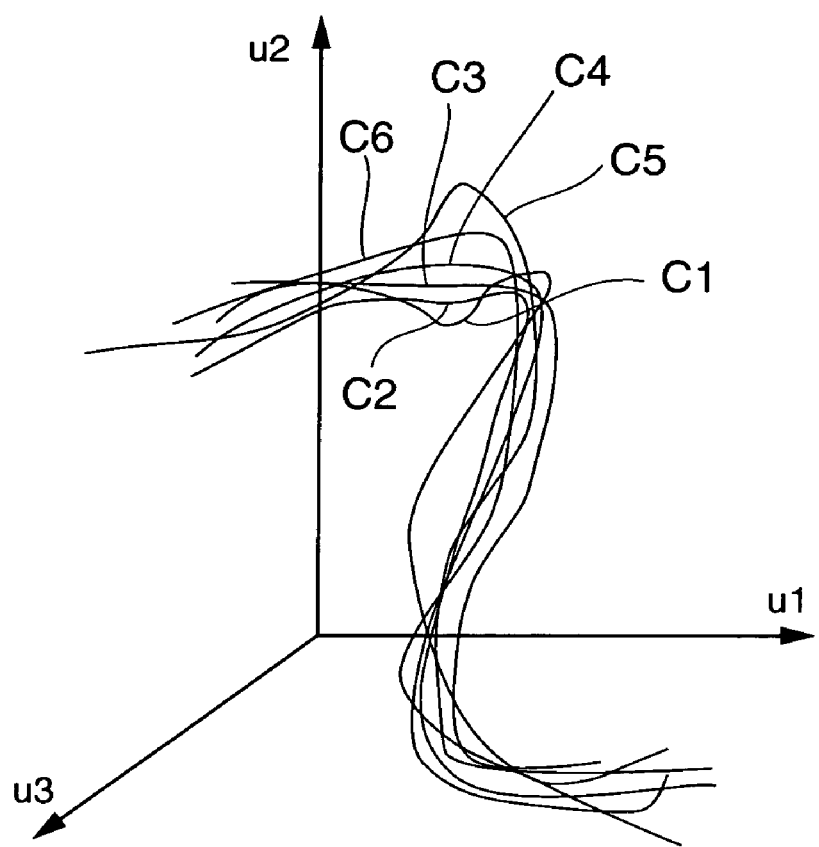
FIG. 35 is an illustration showing curves resulting from projection of motions of mouths in a certain utterance of multiple people onto a feature space.

This hypertube HT expresses the same transformation, and can be deemed as a model probabilistically expressing the variation due to individual differences or the like. The representative locus CC in generation of this hypertube HT can be determined by averaging a plurality of loci C1-C6 representing the same transformation as shown in FIG. 35, or can be determined by adopting another appropriate calculation method. A radius of a circle indicating a variation can be determined by a method of obtaining a variance $\sigma^2$ of distance to a point on each locus in the direction normal to the traveling direction of each point on the representative locus, assuming that the variation is a normal distribution, and defining the radius as $1.96\sigma$ being the 95% point, or may be determined by another method.

Figure 37:
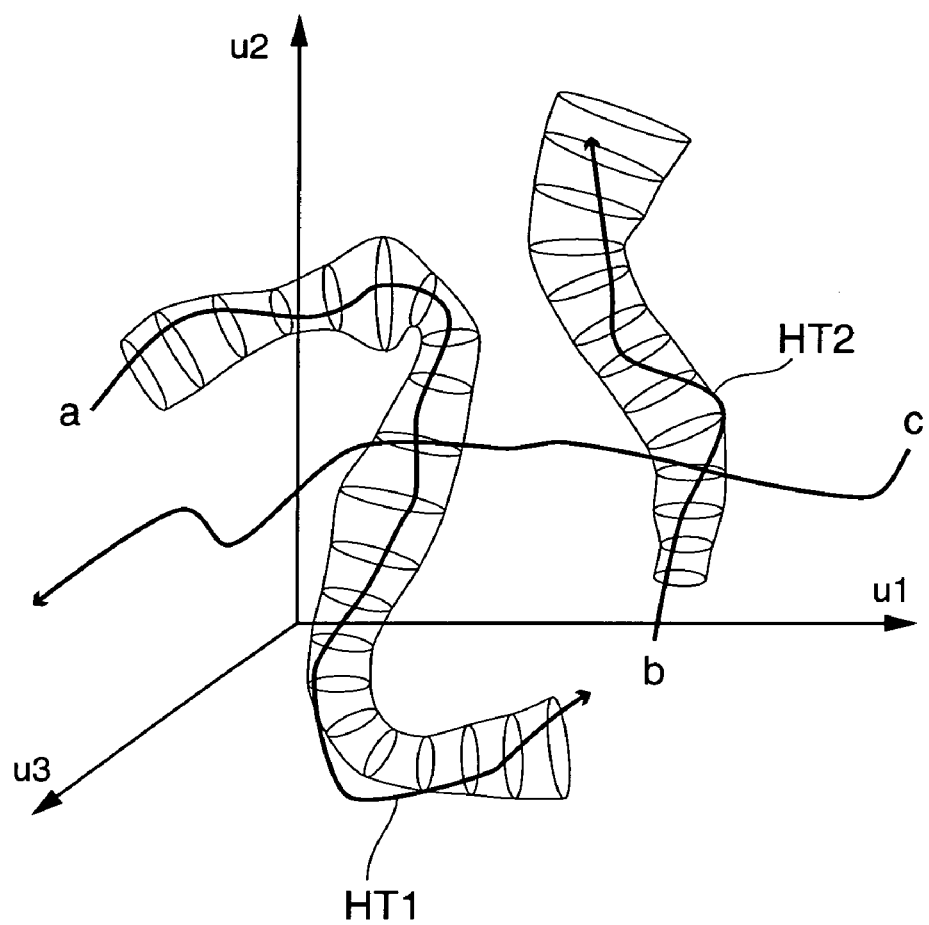
FIG. 37 is an illustration showing a feature space on which a plurality of hypertubes are arranged.

One or more hypertubes HT generated in this manner are arranged on the feature space. In a case where a plurality of hypertubes HT are arranged, one hypertube corresponds to one transformation. FIG. 37 shows the feature space on which a plurality of hypertubes are arranged; for example, hypertube HT1 represents a transformation A, e.g., a transformation from "A" to "I" in an utterance, and hypertube HT2 represents another transformation B, e.g., a transformation from "U" to "E" in another utterance. There are two hypertubes HT1, HT2 in FIG. 37. In the drawing a, b, and c correspond to projective locus information of motion pictures fed from the projection device 74.

Figure 38:
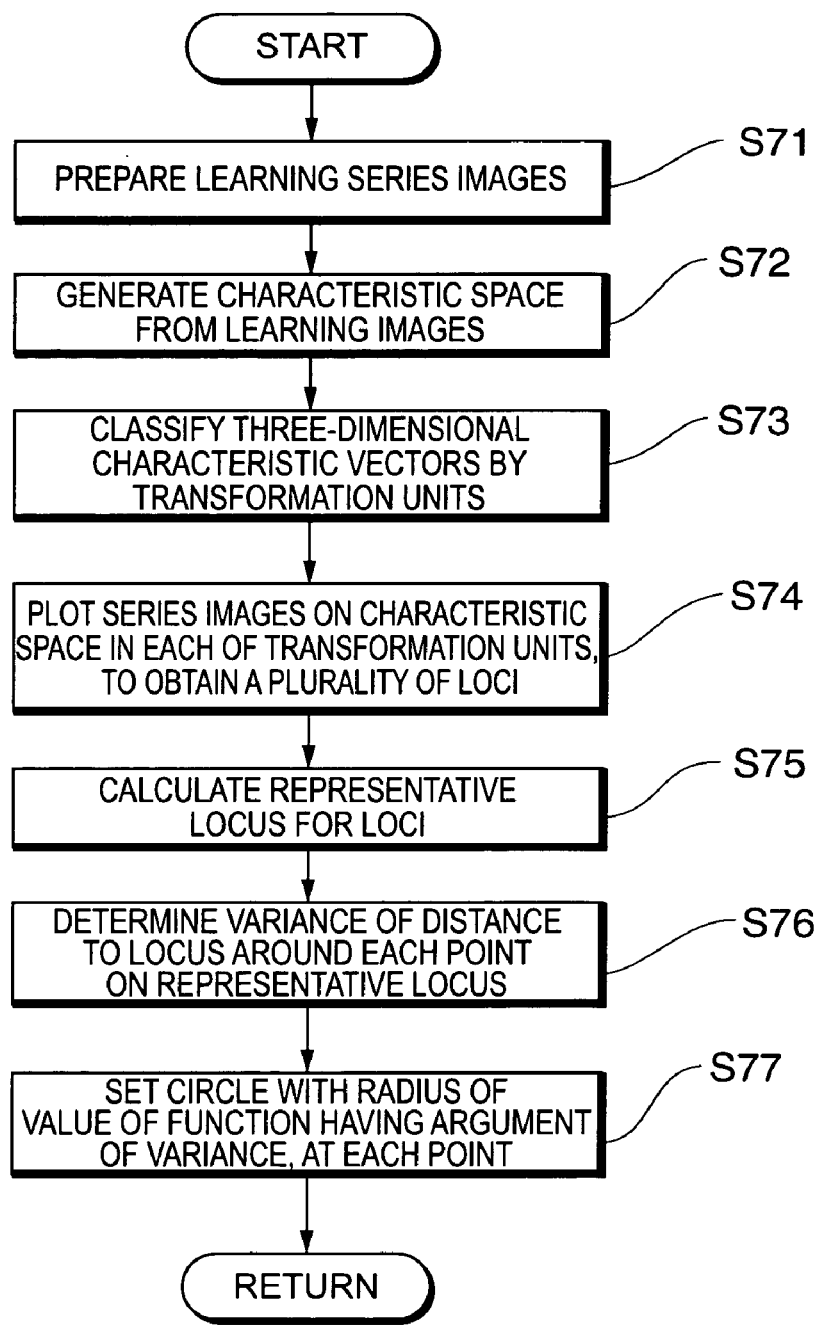
FIG. 38 is a flowchart showing a procedure of generating a hypertube.

Subsequently, let us explain a change information recognition method by the change information recognition apparatus 7 according to the present embodiment. First, a procedure of generating a hypertube will be described. FIG. 38 is a flowchart showing the procedure of generating a hypertube, in the change information recognition method according to the present embodiment. The learning device 71 is preliminarily made to learn many pieces of change information and to generate hypertubes. The recognizing device 72 performs recognition of change information by making use of the hypertubes. A motion picture as learning series information J71 for generating a hypertube is a picture consisting of consecutive images arranged in order of time and representing a transformation from the shape of the mouth uttering a certain sound to the shape of the mouth uttering another sound. Defining this as one transformation unit, the learning series information J71 for each of all transformations to be recognized is prepared by the number of multiple people, e.g., three hundred people (S71). The patterns of change units have to be 30 patterns as shown in FIG. 14. The number of patterns can be properly defined depending upon an object to be recognized and fineness of recognition. For example, in a case where the change information recognition apparatus 7 is used as a voice recognition apparatus to perform voice recognition, supposing the number of phonemes is 29, potential transformation patterns are 29×28=812 patterns.

Next, the feature space generator 73 generates the feature space from the learning series information J71 prepared from three hundred people (S72). The generation of the feature space is carried out as follows. In general, if colors and gray values of respective pixels in an image are handled as they are, the information content is too large and calculation takes too much time, or information can include information unnecessary for recognition; these can often cause a problem. It is thus common practice to extract some characteristic quantities from an image and process them. The present embodiment makes use of gray values of respective pixels as characteristic quantities. Supposing the number of pixels in one image is n, a grayscale image can be expressed as an n-dimensional vector having gray values (characteristic quantities) of the respective pixels as elements, as described above. It is expressed as a point on the n-dimensional space. Let us suppose herein that characteristic quantities extracted from an image are expressed by an m-dimensional vector and m<n. Then one image with the n-dimensional information content is compressed to the m-dimensions by the extraction of characteristic quantities and can be expressed as a point on the m-dimensional space. The feature space generator 73 determines m axes spanning this m-dimensional space. The present embodiment will describe a case where three axes are determined to generate a three-dimensional space.

There are various methods for determining a feature space, and the present embodiment adopts an eigenspace as a feature space. An eigenspace is a space spanned by m eigenvectors selected in descending order from the largest eigenvalue, out of pairs of eigenvectors and eigenvalues determined by the principal component analysis. One image is regarded as an n-dimensional vector, and the vector of the image is denoted by x herein. Vectors of at least two images are necessary for determining an eigenspace, but it is desirable to prepare many images. With input of vectors x in these images, a variance-covariance matrix is calculated according to Eq (1) below.

$$S = E\{(x-m_x)(x-m_x)^T\} \quad (1)$$

In this equation, $m_x$ is an average vector of plural vectors x, and is defined by $m_x = E\{x\}$.

Next, an eigenvalue problem presented by Eq (2) is solved.

$$Su_j = \lambda_j u_j \quad (2)$$

In Eq (2) above, supposing the dimension of the eigenspace to be obtained is m, a comparison is made among magnitudes of eigenvalues, and a space spanned by eigenvectors $\{u_1, u_2, \ldots, u_m\}$ corresponding to m eigenvalues from the largest is defined as the feature space. Since the present embodiment is arranged to generate a three-dimensional eigenspace (m=3), the three-dimensional eigenspace is generated from eigenvectors $\{u_1, u_2, u_3\}$.

After the feature space is generated in this manner, the learning series information J71 is fed to the projection device 74 and the feature space generator 73 feeds the eigenvectors u $(=\{(u_1, u_2, \ldots, u_m\})$ of the feature space generation information to the projection device 74. The projection device 74 generates a projective locus obtained by projection of a motion picture onto the feature space. This projective locus can be an m-dimensional characteristic vector y resulting from transformation of an n-dimensional vector x in the image of the learning series information J71 according to Eq (3) below, using the foregoing eigenvectors u.

$$y = \{u_1, u_2, \ldots, u_m\}^T x \quad (3)$$

In the present embodiment, m=3, as described above, and thus the projective locus is a three-dimensional characteristic vector y.

After the feature space and three-dimensional characteristic vector are generated in this manner, the feature space generator 73 feeds the feature space to the hypertube generator 75 and the projection device 74 feeds the three-dimensional characteristic vector to the hypertube generator 75. The hypertube generator 75 generates a hypertube, based on the feature space and the three-dimensional characteristic vector thus fed. Since the premise for generation of the hypertube is that one image is projected to one point on the three-dimensional feature space, a series of images representing a sequential transformation can be expressed as a locus of points on the three-dimensional feature space. Since the learning series information J71 is prepared for each of plural transformation units, the projection device 74 feeds a series of three-dimensional characteristic vectors corresponding to the number of learning series information J71. The hypertube generator 75 classifies these three-dimensional characteristic vectors by transformation units in the learning series information J71 before projection (S73). Subsequently, the series of three-dimensional characteristic vectors classified by the transformation units in the learning series information J71 before projection are plotted in each of those transformation units onto the feature space to obtain a plurality of loci corresponding to the number of transformation units (S74). These loci are represented, for example, by curves C1-C6 shown in FIG. 35.

Figure 39:
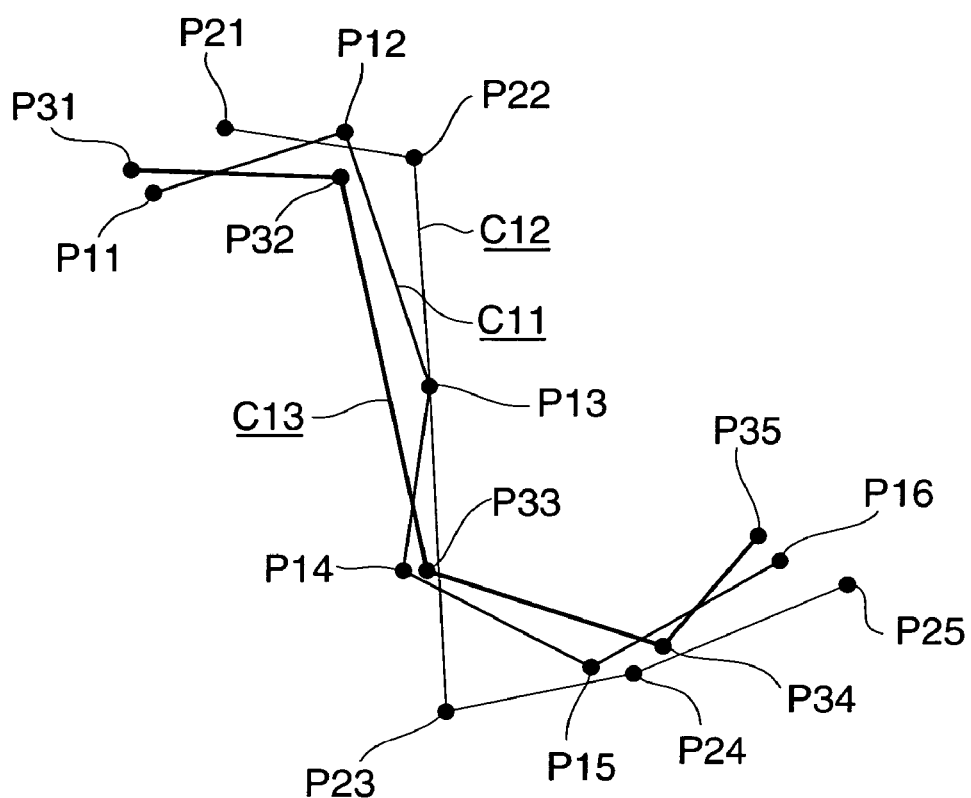
FIG. 39 is an illustration showing three loci formed by connecting plotted points of three-dimensional characteristic vectors on a feature space.

After the plurality of loci on the feature space are obtained in this manner, a representative locus is determined as a representative for these loci (S75). The representative locus can be determined by various methods, and a method of adopting an average of loci obtained will be described below. Since the loci are those representing a transformation of the same kind, they draw similar loci on the feature space. However, even if transformations are of the same kind, the number and arrangement of three-dimensional characteristic vectors constituting the series are not always identical. FIG. 39 shows an example of three loci formed by connecting points plotted from three-dimensional characteristic vectors on the feature space. In the example shown in FIG. 39, there are three loci C11-C13 indicating the same transformation, and the locus C11 is formed by connecting six points P11-P16 plotted on the feature space. In contrast to it, the locus C12 is formed by connecting five points P21-P25 plotted on the feature space, and the locus C13 by connecting five points P31-P35 plotted on the feature space.

Figure 40:
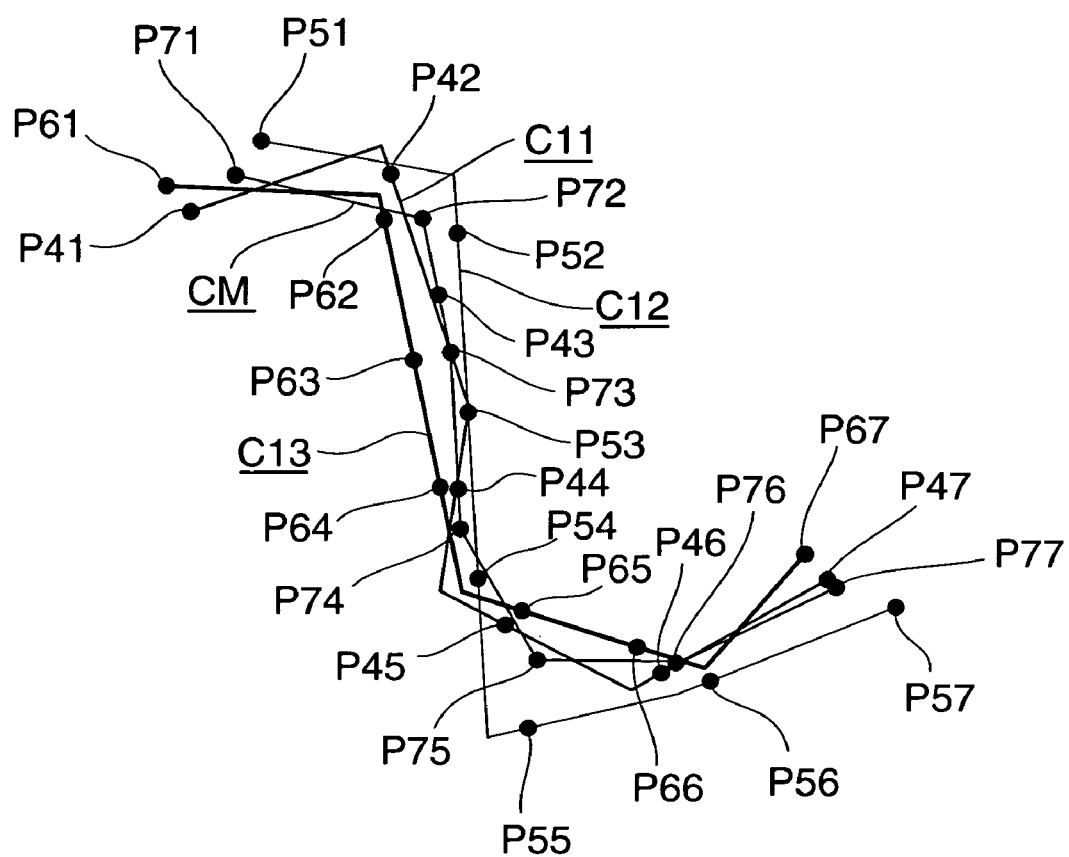
FIG. 40 is an illustration showing three loci and a representative locus formed based on those loci.

Then a reconfiguration to replot points on each of the loci C11-C13 is carried out so as to construct each locus in the same number of points. A method of replotting points on each of loci C11-C13 can be selected from a variety of methods such as the spline curve method. In this example, the loci C11-C13 are simply set so that each has the same distance ratio. For that purpose, as shown in FIG. 40, points are rearranged so that each of the loci C11-C13 is composed of seven points. This results in arranging points P41-P47 on the locus C11, points P51-P57 on the locus C12, and points P61-P67 on the locus C13.

For these loci C11-C13, an average of coordinate values of corresponding points in order is calculated, each point corresponding to the average of coordinate values is plotted, and points of averages are connected. Specifically, an average is calculated among the coordinate of point P41 on the locus C11, the coordinate of point P51 on the locus C12, and the coordinate of point P61 on the locus C13, to obtain a coordinate of point P71. Likewise, a coordinate of point P72 is calculated from the coordinates of points P42, P52, and P62; a coordinate of point P73 is calculated from the coordinates of points P43, P53, and P63; a coordinate of point P74 is calculated from the coordinates of points P44, P54, and P64. In addition, a coordinate of point P75 is calculated from the coordinates of points P45, P55, and P65; a coordinate of point P76 from the coordinates of points P46, P56, and P66; a coordinate of point P77 from the coordinates of points P47, P57, and P67. The representative locus CM can be generated by connecting the points P71-P77 obtained in this manner.

Figure 41:
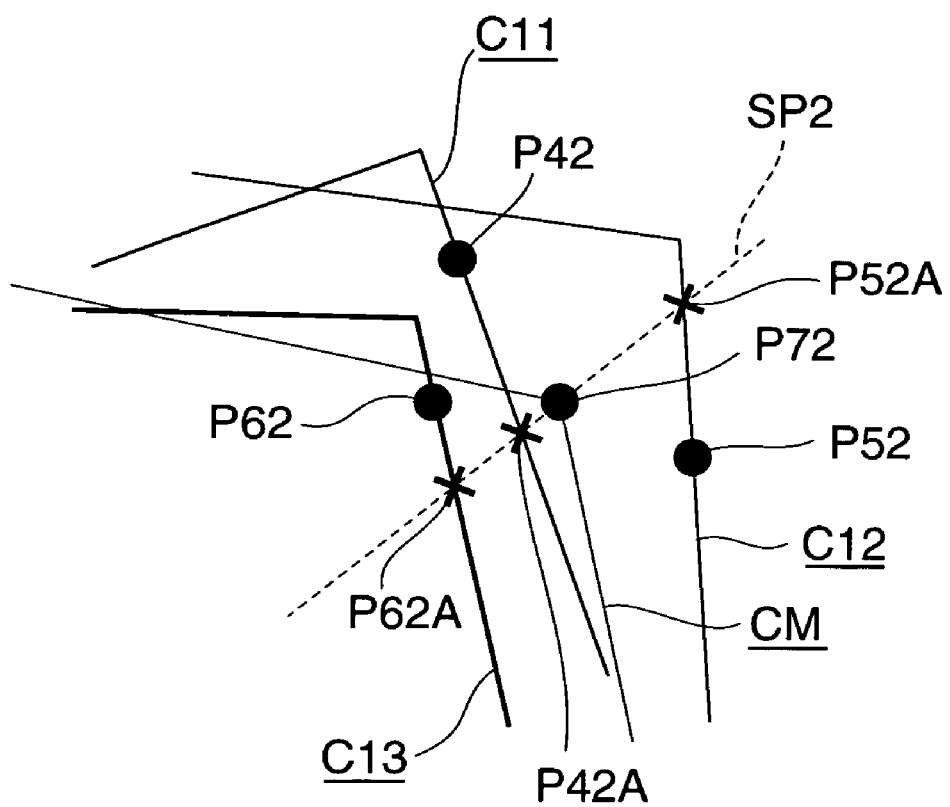
FIG. 41 is an illustration for explaining a procedure of determining a hyperplane generated on the occasion of determining a representative locus.

After the representative locus CM is determined in this manner, the variance of distance to a locus around each point is determined as to each point on the representative locus CM (S76). This variance can be determined by hypothesizing a hyperplane in a direction perpendicular to the traveling direction of the representative locus CM at each of points P71-P77 on an representative locus CM and obtaining the variance of distance to an intersecting point between the hyperplane and each locus C11-C13. Since the present embodiment describes the example of the three-dimensional space, the hypothesized plane is not a hyperplane but a two-dimensional plane, but the description hereinafter will also be given by use of the hyperplane, for readiness of description. This will be described with reference to FIG. 41. Let us assume a hyperplane SP2 perpendicular to the traveling direction of the representative locus CM at a point P72 on the representative locus CM. Points P42A, P52A, and P62A are obtained at intersections between this hyperplane SP2 and each locus C11-C13. Then the variance is determined from the distance between point P72 and point P42A, the distance between point P72 and point 52A, and the distance between point P72 and point 62A. Then the variance is put into argument x in a function, for example, represented by Eq (4) below.

$$f(x) = 1.96(x)^{1/2} \quad (4)$$

The coefficient 1.96 used herein is an example of the coefficient.

Figure 42:
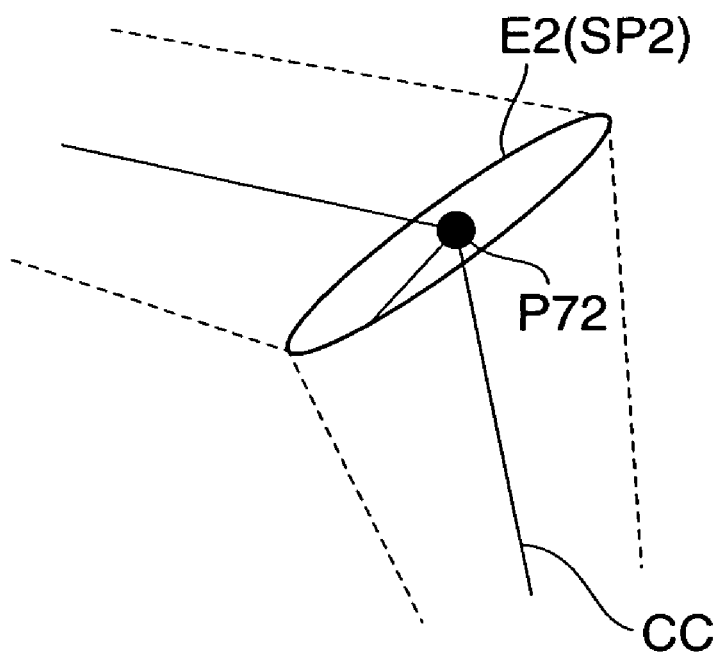
FIG. 42 is an illustration showing a hyperplane for explaining a procedure in determination of a representative locus.

Then, as shown in FIG. 42, a circle E2 with a radius being the value resulting from input of the argument x in this Eq (4) into f(x) is set on the hyperplane SP2. For each of the other points P71, P73-P77 on the representative locus CC, the same processing is carried out to obtain hyperplanes SP1, SP3-SP7, and circles E1, E3-E7 as shown in FIG. 36 are determined on the hyperplanes. In this manner, the circles E1-E7 each having the radius of the value of the function with the argument of variance are set at the respective points P71-P77 (S77), and these circles E1-E7 are connected to generate the hypertube HT as shown in FIG. 36.

Figure 43:
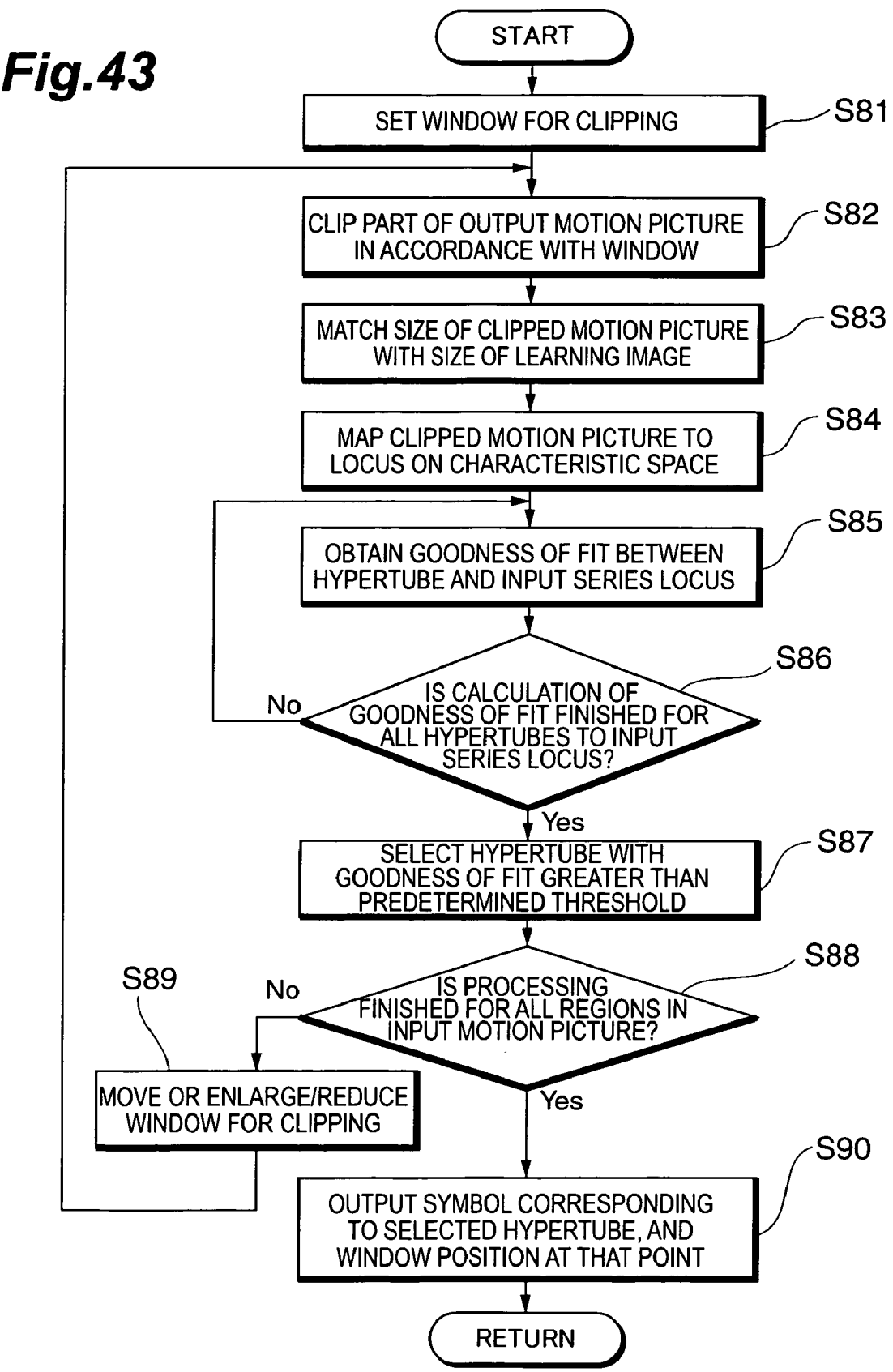
FIG. 43 is a flowchart showing a procedure of a change information recognition method according to the seventh embodiment.

After the hypertube is generated in this manner, the recognition process can be performed. Subsequently, a process of change recognition with the hypertube will be described. FIG. 43 is a flowchart showing a procedure of a change information recognition method according to the present embodiment.

First, the unrepresented motion picture taking device takes a motion picture of a face including a mouth of a man being a recognition object, and feeds the motion picture as recognition series information to the projection device 74. The projection device 74 sets a window of an appropriate size in the input motion picture (S81). After the window is set, a part of the motion picture thus fed is clipped in accordance with this window (S82). By clipping a part of the motion picture in this manner, it is feasible to obtain a motion picture clipped in the size of the window. Subsequently, the size of the window clipped is properly enlarged or reduced so that the size of the motion picture becomes finally coincident with the size of a learning image (the image used in preparation of learning series information J71) (S83). In this way, the motion picture in the window of the adjusted size is mapped as a locus thereof onto the feature space generated by the feature space generator 73, by a procedure similar to that of preparing the hypertube, thereby generating an input series locus (S84). The input series locus thus generated is fed to the series comparator 77. In addition, the series comparator 77 receives a plurality of hypertubes and symbols corresponding to the hypertubes, which are stored in the hypertube storage 76.

Figure 44A:
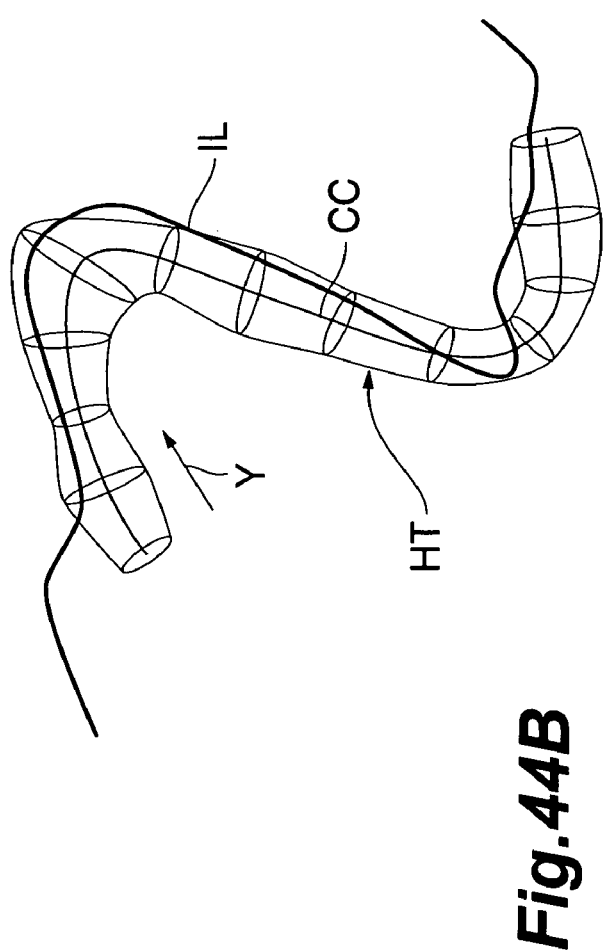
FIG. 44A is an illustration showing a hypertube HT representing a certain transformation, and a locus of input series locus IL together.
Figure 44B:
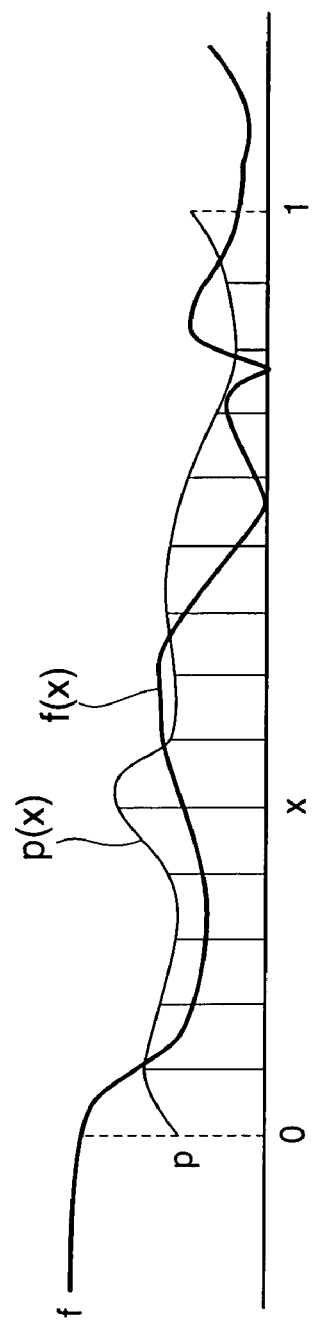
FIG. 44B is an illustration showing a correspondence state to a graph in which the horizontal axis has zero at a start point of the hypertube and 1 at an end point thereof and in which the vertical axis represents the distance from the representative locus.

The series comparator 77 compares the input series locus fed from the projection device 74, with the hypertubes fed from the hypertube storage 76, to obtain a goodness of fit between them (S85). The goodness of fit between them can be obtained as follows. As described above, a hypertube HT is a model probabilistically expressing individual differences for the same transformation. Since this model can be regarded as a probability density function to express a variation at each position on the representative locus CC by a radius of a circle, the goodness of fit between the input series locus and the hypertube can be calculated as a probability. FIG. 44A shows a hypertube HT representing a certain transformation, and a locus of input series locus IL together. Here the hypertube HT has a representative locus CC. Two types of opposite transformations can be considered as transformation units represented by the hypertube HT, depending upon the traveling directions in the hypertube HT. Supposing the transformation unit herein is one along the direction of arrow Y, it can be made to correspond to a graph in which the horizontal axis has a start point of the hypertube as 0 and an end point as 1 and in which the perpendicular axis represents the distance from the representative locus CC, as shown in FIG. 44B. This graph can be regarded just as one obtained by horizontally expanding the hypertube.

Let a function p(x) in the domain of $0 \leq x \leq 1$ represent a radius of the hypertube at a position x on the representative locus CC, and let f(x) represent a distance from the position x on the representative locus CC to the input series locus IL.

Then the goodness of fit $s_i$ between the hypertube i and the input series can be represented by Eq (5) below.

$$s_i = \int_0^1 N_{(0,1)}\left(\frac{f(x)}{p_i(x)}\right)dx \qquad (5)$$

In Eq (5), $N_{(0,1)}(x)$ is a normal density function with the average of 0 and the variance of 1. The goodness of fit between the input series locus IL and the hypertube HT can be determined be Eq (5) above.

The goodness of fit as described above is calculated for a plurality of hypertubes HT, and it is determined whether the calculation of the goodness of fit is finished for all the hypertubes HT relative to the input series locus IL (S86). When it is not finished, the flow returns to step S85 to calculate the goodness of fit between another hypertube HT and the input series locus IL. On the other hand, after the goodness of fit is calculated for all the hypertubes HT, a hypertube HT whose goodness of fit to the input series locus IL is larger than a predetermined threshold is selected (S87), and the hypertube HT and a symbol corresponding thereto are stored.

Since the input series information is one clipped from the input motion picture in accordance with the window, the same sequential processing is also repeated for the other portions in the input motion picture, while moving or enlarging/reducing the window. Therefore, it is determined whether the above processing is finished for all the regions in the input motion picture (S88). When the result of the determination is that there is a region not processed yet, the window for clipping is moved or enlarged/reduced (S89), and the flow returns to step S82 to repeat the same processing. When it is determined on the other hand that the processing is finished for all the regions, change information-corresponding symbol information J74 (FIG. 31) corresponding to the selected hypertube HT, and change information unit position information J73 of the window at that time are fed to the unrepresented output device (S90). By generating the hypertube from the learning series information, placing it on the feature space, and calculating the goodness of fit to the input series in this manner, it is feasible to detect the position of the recognition object in the input motion picture and a type of the transformation.

In the present embodiment, when a certain motion picture is fed, the motion picture is expressed as a locus on the feature space. The present embodiment is provided with means for calculating the evaluated value between the locus and each hypertube; therefore, in a case where all or some of input loci have evaluated values over a certain value (or below a certain value), it is possible to adopt a configuration of recognizing a transformation corresponding to a hypertube with the highest (or lowest) evaluated value among them.

The present embodiment described the configuration wherein an utterance was recognized from the motion of the mouth, using the hypertubes obtained from the learning series information, but it is also possible to perform transformation recognition while generating similar hypertubes for other transformation information. For example, in a case where change information is a voice change acquired from a voice acquiring means, frequency changes from "A" to "I" and from "A" to "U" can be expressed by hypertubes. In a case where the change information is a change of gesture in a motion picture taken by the motion picture taking means, a change from a closed hand state to an open hand state can be expressed by a hypertube. In a case where the change information is a change of walking states of a pedestrian taken by the motion picture taking means, a transformation in one walking motion can be expressed by a hypertube. Furthermore, in a case where the change information is a change of expressions taken by the motion picture taking means, the change from the emotionless expression to the expression of delight can also be expressed by a hypertube. In a case where the change information is a change of a rotating object taken by the motion picture taking means, a change in the direction of the face changing from the state of 0° to the state of 90° can be expressed by a hypertube.

Next, the eighth embodiment of the present invention will be described.

Figure 45:
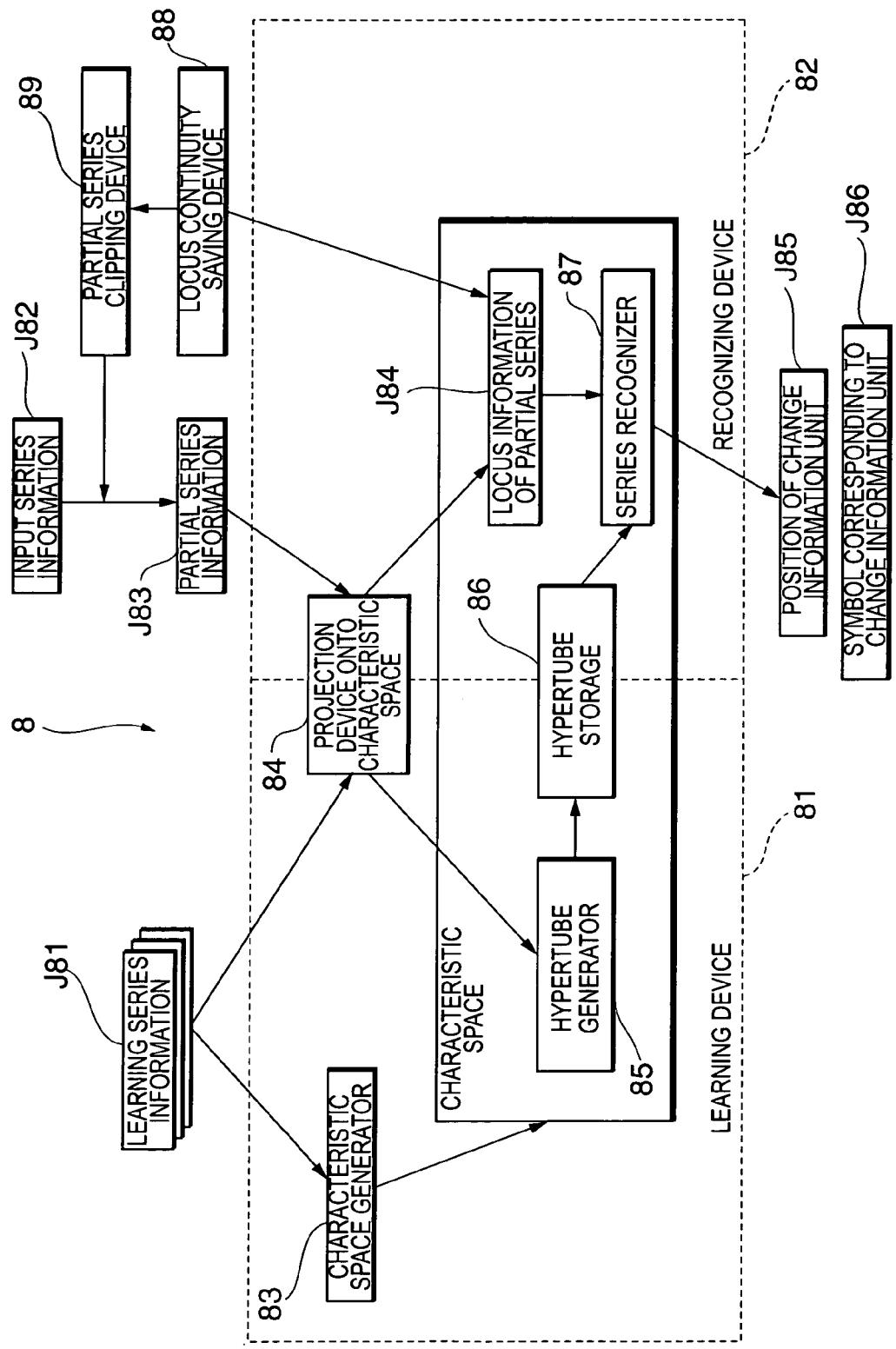
FIG. 45 is a block configuration diagram of a change information recognition apparatus according to the eighth embodiment.

FIG. 45 is a block configuration diagram of a change information recognition apparatus according to the present embodiment. As shown in FIG. 45, the change information recognition apparatus 8 of the present embodiment is mainly different from the above seventh embodiment in that the change information recognition apparatus 8 of the present embodiment is provided with a locus continuity saving device 88 and a partial series clipping device 89.

The continuity saving device 88 saves the continuity of a locus corresponding to the representative locus in the hypertube. The continuity of a locus is determined by whether a change amount of the locus is not more than a predetermined threshold. When a change amount of a locus is not more than the predetermined threshold, the locus is determined to have continuity. The partial series clipping device 89 is connected to the continuity saving device 88, and the continuity saving device 88 feeds the continuity of the locus saved in the continuity saving device 88, to the partial series clipping device 89.

Next, a change information recognition method according to the present embodiment will be described. In the change information recognition method of the present embodiment, as in the seventh embodiment, the learning series information is fed to the learning device 81. In the learning device 81, the feature space generator 83 generates a feature space from the learning series information J71 thus fed, the hypertube generator 85 generates a hypertube, and the hypertube storage 86 stores the hypertube thus generated.

On the other hand, the recognizing device 82 receives information based on a motion picture taken by an unrepresented motion picture taking means. This information was the recognition series information in the above seventh embodiment, but the present embodiment is different in this point. In the present embodiment, the partial clipping device 89 clips partial series information J83 from the input series information J82 consisting of the motion picture taken by the unrepresented motion picture taking means. The continuity of the locus is fed to the partial series clipping device 89, and the partial series clipping device 89 clips the input series information J82 on the basis of the continuity of the locus to generate the partial series information J83.

Figure 46:
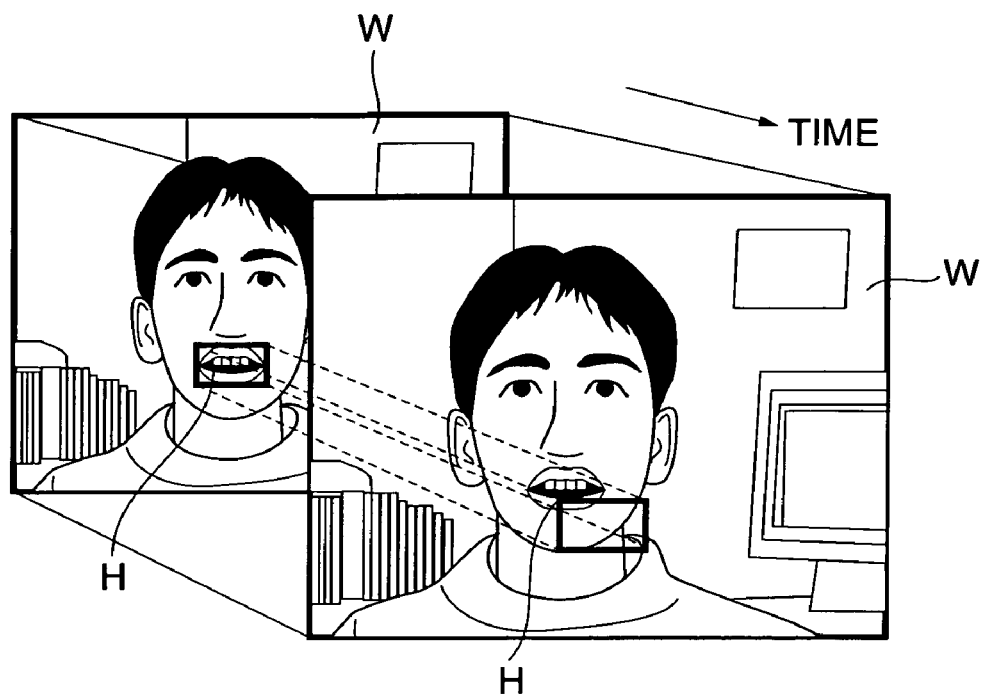
FIG. 46 is an illustration for explaining a taken state of a motion picture without moving a window for clipping an image, for a fixed period of time.

For example, in the above seventh embodiment, movement of the clipping window is not assumed during a period of a certain time for the motion picture, as shown in FIG. 46, in the operation of clipping a part of the input motion picture in accordance with the window. This is based on the assumption that the transforming object is stationary in the image, and, therefore, movement of the recognition object in the image could result in failure in detection of the recognition object. The recognition object often moves in actual scenes, and the above configuration will fail to support such cases.

Figure 47A:
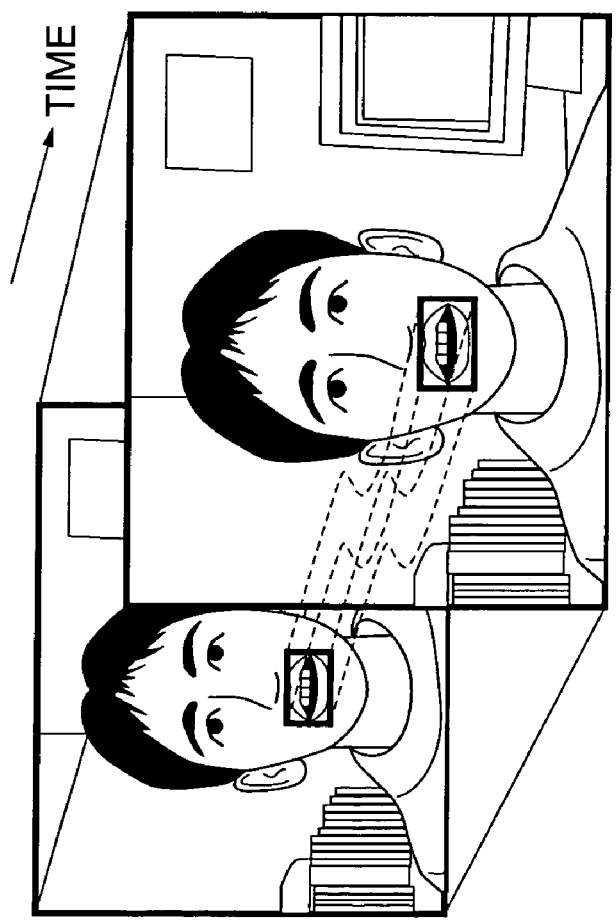
FIG. 47A is an illustration for explaining a motion picture in which a clipping window is moved to follow a mouth.
Figure 47B:
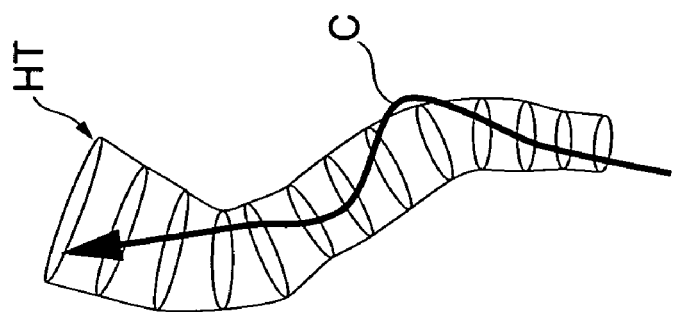
FIG. 47B is an illustration showing a locus and a hypertube on a feature space corresponding to FIG. 47A.

In contrast to it, the change recognition method according to the present embodiment is arranged to clip the input series information so as to form the partial series information of the motion picture in correspondence to the continuity of the change of the locus. Supposing the recognition object is in motion, the window W is assumed to accurately follow the mouth M as a recognition object, as shown in FIG. 47A. Then a projective locus C on the feature space has a high goodness of fit to a specific hypertube HT and draws a smooth curve in the feature space, as shown in FIG. 47B. At a frame rate of ordinary TV signals or the like (e.g., 30 Hz), movement of an object in a scene is small between adjacent frames and a change is not so sudden. For this reason, the change of the position of the window W to be trailed also normally draws a smooth locus.

Therefore, by moving the window W so as to simultaneously satisfy the continuity of the locus of the hypertube in the feature space and the continuity of the moving locus of the window W in the input series information, it becomes feasible to detect and follow the mouth M moving with transformation, and to simultaneously detect the state of the transformation. In this manner, the partial series information J83 is generated, the partial series information is fed to the projection device 84, the projection device 84 projects the partial series information J83 onto the feature space to generate locus information J84 of partial series, and it feeds the locus information to the series comparator 87. The series comparator 87 compares the locus of the partial series fed from the projection device 74, with the hypertubes fed from the hypertube storage 76 to determine the goodness of fit between them by a method similar to that in the seventh embodiment. Then the series comparator feeds symbol information J86 corresponding to the hypertube HT selected in the same manner as in the seventh embodiment, and position information J85 of the window at that time to the unrepresented output device. In this manner, the position of the recognition object in the motion picture and a type of the transformation can be detected.

In the change recognition method of the present embodiment, as described above, there is provided the continuity saving means for saving the continuity of the locus, whereby it is feasible to securely recognize the transformation of the recognition object moving in the motion picture, and the position thereof.

With reference to FIG. 1 and FIG. 12 in the above embodiment the description was given with the example of the human mouth, for easier description of the embodiment, but it is noted that the present invention can be readily applied to other recognition objects with transformation.

As described above, the present invention successfully provides the change information recognition apparatus and change information recognition methods capable of accurately recognizing a change state of a recognition object, e.g., a word spoken by a man or the like.

The present invention is applicable to the change information recognition apparatus and change information recognition methods for recognizing a change state of a recognition object, such as a motion of a mouth, a voice uttered from a mouth, or a motion of a man.

What is claimed is:

1. A change information recognition apparatus comprising;
   change information acquiring means for acquiring change information of a recognition object;
   basic change information storing means for preliminarily storing basic change states of the recognition object as basic change information; and
   change state comparing means for comparing the change information of the recognition object acquired by the change information acquiring means, with the basic change information preliminarily stored and thereby recognizing a change state of the recognition object;
   wherein the basic change information storing means stores the basic change information in the form of change information units resulting from division of the change state of the recognition object into basic units,
   wherein the basic change information is basic change series information set as series of information on a feature space,
   wherein the change information recognition apparatus further comprises a change information projection device for projecting change series information of the recognition object acquired by the change information acquiring means, onto the feature space to create projective change information, and
   wherein, instead of comparing the change information of the recognition object with the basic change information, the change state comparing means compares the projective change information with the basic change series information to recognize the change state of the recognition object.

2. The change information recognition apparatus according to claim 1, wherein the change information acquiring means is image taking means for taking an image of the recognition object,
   wherein the change information storing means preliminarily stores the basic change series information in the form of a tubular region on the feature space, and
   wherein the change state comparing means grasps the change state of the recognition object defined by a plurality of consecutive images acquired by the change information acquiring means, as a linear projective locus on the feature space, and compares the projective locus with the tubular region to recognize the change state of the recognition object.

3. The change information recognition apparatus according to claim 2, wherein the change state comparing means compares a continuity property of the basic change series information with a continuity property of the basic change series information with a continuity property of the projective change information to recognize the change state of the recognition object.

4. The change information recognition apparatus according to claim 3, further comprising learning means for creating the basic change series information, based on the change information of the recognition object acquired by the change information acquiring means.

* * * * *